(12) United States Patent
Shibai et al.

(10) Patent No.: US 11,650,457 B2
(45) Date of Patent: May 16, 2023

(54) DEMARCATING MEMBER, DEMARCATING STRUCTURE BODY, SURFACE LIGHT SOURCE, AND LIQUID-CRYSTAL DISPLAY DEVICE

(71) Applicant: NICHIA CORPORATION, Anan (JP)

(72) Inventors: Koki Shibai, Itano-gun (JP); Shimpei Sasaoka, Itano-gun (JP); Yoshihiro Sho, Fujiyoshida (JP); Naoya Kashiwagi, Itano-gun (JP)

(73) Assignee: NICHIA CORPORATION, Anan (JP)

( * ) Notice: Subject to any disclaimer, the term of this patent is extended or adjusted under 35 U.S.C. 154(b) by 0 days.

(21) Appl. No.: 17/660,827

(22) Filed: Apr. 26, 2022

(65) Prior Publication Data

US 2022/0350203 A1 Nov. 3, 2022

(30) Foreign Application Priority Data

Apr. 28, 2021 (JP) .............................. JP2021-076714

(51) Int. Cl.
 *G02F 1/13357* (2006.01)
(52) U.S. Cl.
 CPC .. *G02F 1/133608* (2013.01); *G02F 1/133603* (2013.01); *G02F 1/133606* (2013.01)
(58) Field of Classification Search
 None
 See application file for complete search history.

(56) References Cited

U.S. PATENT DOCUMENTS

2013/0128128 A1* 5/2013 Ikuta ................. G02F 1/133603
349/67
2018/0372300 A1 12/2018 Ohkawa
2019/0371985 A1* 12/2019 Imada ................... F21V 23/002

FOREIGN PATENT DOCUMENTS

| JP | 2011124196 A | 6/2011 |
| JP | 2020024875 A | 2/2020 |
| JP | 2020024876 A | 2/2020 |
| WO | 2017150035 A1 | 9/2017 |

* cited by examiner

*Primary Examiner* — Phu Vu
(74) *Attorney, Agent, or Firm* — Hunton Andrews Kurth LLP

(57) ABSTRACT

A surface light source includes a plurality of light sources, a substrate, a first member disposed on the substrate and including a plurality of recessed first demarcating portions each including a first inclined portion and a first bottom portion and one or more recessed second demarcating portions each including a second inclined portion and a first opening, and a second member overlying a portion of the first member and including a third inclined portion overlapping with the second inclined portion, a fourth inclined portion adjacent to the third inclined portion and not overlapping with the second inclined portion, a second bottom portion located inside the first opening, and a third bottom portion continuous with a lower end of the fourth inclined portion, and the plurality of light sources being respectively disposed on the substrate exposed in the first bottom portion, the second bottom portion, and the third bottom portion.

13 Claims, 25 Drawing Sheets

DEMARCATING MEMBER, DEMARCATING STRUCTURE BODY, SURFACE LIGHT SOURCE, AND LIQUID-CRYSTAL DISPLAY DEVICE

CROSS-REFERENCE TO RELATED APPLICATIONS

This application claims priority to Japanese Patent Application No. 2021-076714, filed on Apr. 28, 2021, the disclosure of which is hereby incorporated by reference in its entirety.

BACKGROUND OF THE INVENTION

1. Field of the Invention

The present disclosure relates to a demarcating member, a demarcating structure body, a surface light source, and a liquid-crystal display device.

2. Description of Related Art

A surface light source including light sources arranged on a substrate in row and column directions and a demarcating member including inclined portions surrounding each light source has been known. When such a surface light source has the large outer shape, a plurality of demarcating members may be disposed on a single substrate. In such a case, arrangement of a cover member over a portion in which demarcating members are adjacent to each other has been proposed as a countermeasure against luminance unevenness (for example, see Japanese Unexamined Patent Application Publication No. 2020-024876).

However, when the cover member or the demarcating members contract with heat generated when the light sources are driven or the like, the shape of the demarcating members may change, or the cover member may peel off, resulting in luminance unevenness. As described above, a countermeasure against luminance unevenness caused by thermal contraction has not been sufficiently achieved.

SUMMARY OF THE INVENTION

An object of the present disclosure is to reduce luminance unevenness caused by thermal contraction in a surface light source including a plurality of members including demarcating portions. Another object is to provide a demarcating member and a demarcating structure body used for the surface light source, and a liquid-crystal display device employing the surface light source.

The present surface light source includes a plurality of light sources, a substrate, a first member disposed on the substrate and including a plurality of recessed first demarcating portions arranged in row and column directions and one or more recessed second demarcating portions adjacent to an outermost column of the first demarcating portions, and a second member overlying a portion of the first member. The first demarcating portions each include a first inclined portion and a first bottom portion continuous with a lower end of the first inclined portion. The one or more second demarcating portions each include a second inclined portion and a first opening reaching at least a portion of a lower end of the second inclined portion in a plan view, and the second member includes a third inclined portion overlapping with the second inclined portion located at an outer edge on a side of the second member, a fourth inclined portion adjacent to the third inclined portion and not overlapping with the second inclined portion, a second bottom portion located inside the first opening continuously with a lower end of the third inclined portion and bonded to the substrate, and a third bottom portion continuous with a lower end of the fourth inclined portion. The plurality of light sources are respectively disposed on the substrate exposed in the first bottom portion, the second bottom portion, and the third bottom portion.

With certain embodiments in the present disclosure, luminance unevenness caused by thermal contraction in a surface light source including a plurality of members including demarcating portions can be reduced. In addition, a demarcating member and a demarcating structure body used for the surface light source, and a liquid-crystal display device employing the surface light source can be provided.

DETAILED DESCRIPTION OF EMBODIMENTS

Figure 1:
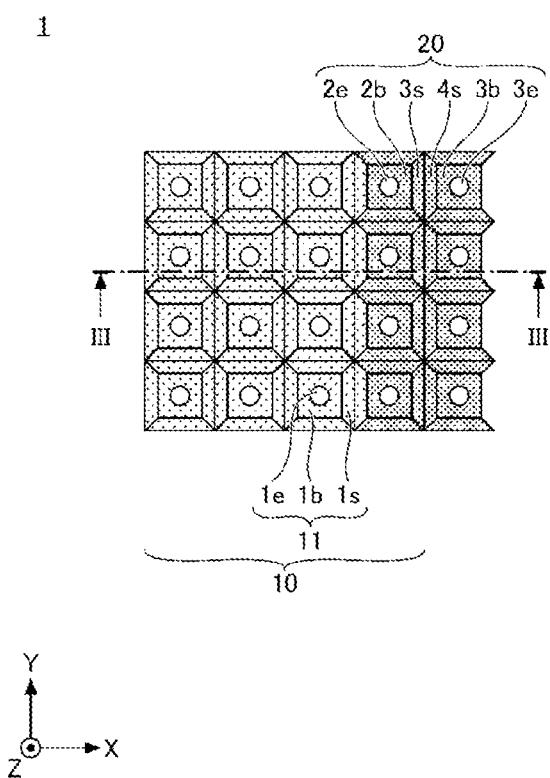
FIG. 1 is a first exemplary schematic plan view illustrating an exemplary demarcating member 1.

Certain embodiments of the present invention will be described below with reference to the accompanying drawings. The description below includes terms indicating specific directions or positions (such as "up", "down", and other terms containing these terms) as appropriate. These terms are used to facilitate understanding of the present invention referring to the drawings, and the meanings of these terms do not limit the technical scope of the present invention. A portion with the same reference numeral in a plurality of drawings represents the same or equivalent portion or member.

In the embodiments described below, examples of a surface light source and the like are described to give concrete form to the technical idea of the present invention, and the present invention is not limited to the description below. Unless otherwise specified, sizes, materials, shapes, and relative positions of constituent components described below are not intended to limit the scope of the present invention thereto but rather are described as examples. Constitutions described in one embodiment may be applicable to other embodiments and modifications. Sizes or positional relationships of members illustrated in the drawings may be exaggerated in order to clarify the descriptions. A schematic diagram in which illustration of components is partially omitted may be used, and an end view showing only a cross section of a member may be used as a cross-sectional view in order to prevent the drawings from being too complicated.

First Embodiment

As for a first embodiment, a demarcating member will be first described, and a demarcating structure body in which the demarcating member is disposed on a substrate and a surface light source in which the demarcating member and light sources are disposed on the substrate will then be described.

Demarcating Member 1

Figure 2:
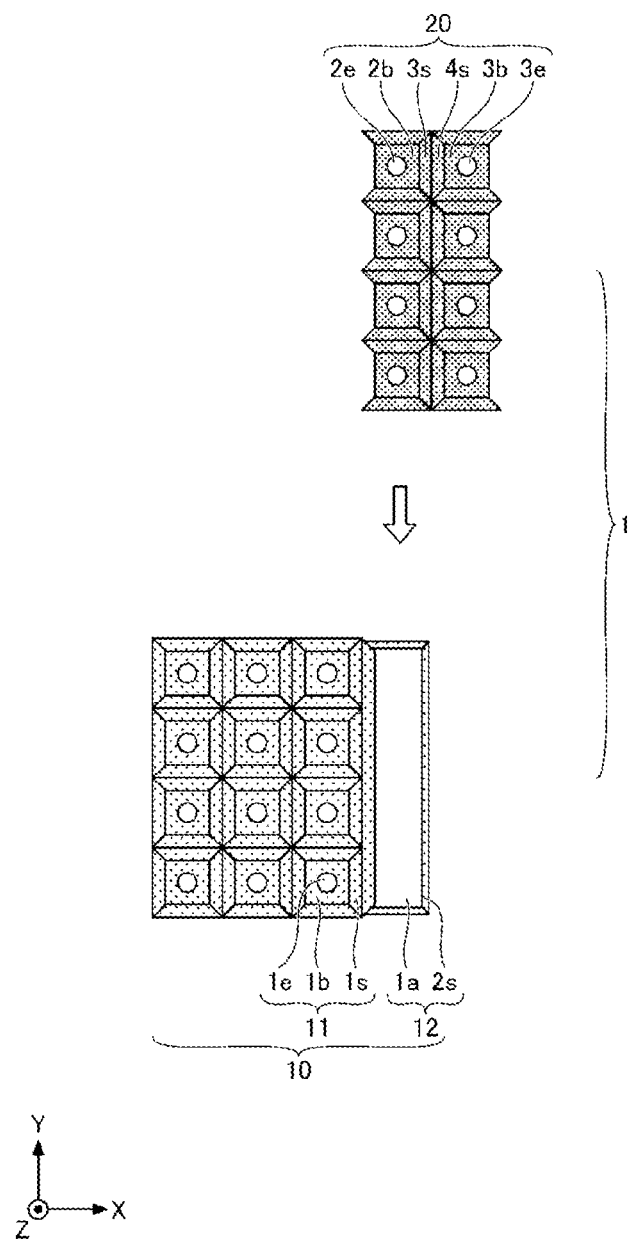
FIG. 2 is a second exemplary schematic plan view illustrating the exemplary demarcating member 1.
Figure 3:
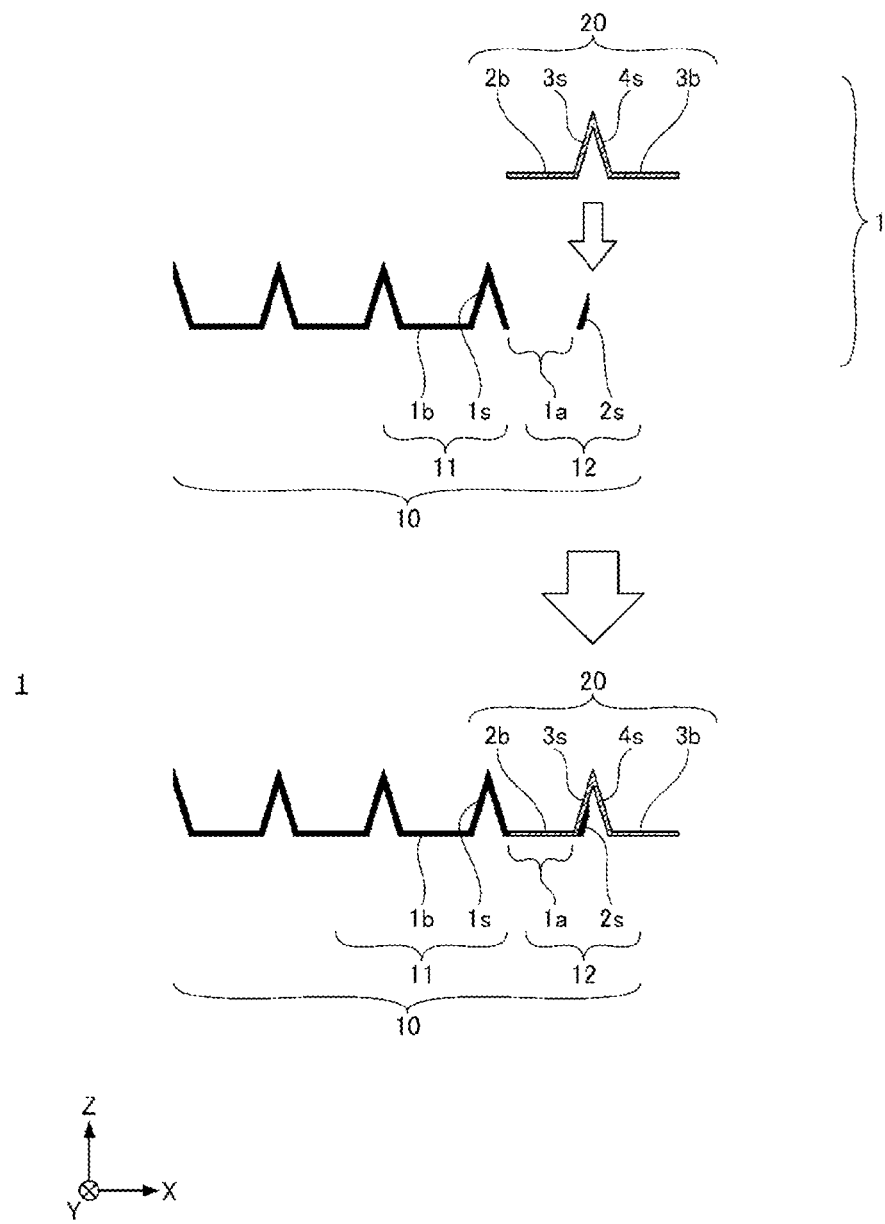
FIG. 3 is a schematic cross-sectional view taken along the line of FIG. 1.

FIG. 1 is a first schematic plan view illustrating a demarcating member 1. FIG. 1 schematically shows a state in which a first member 10 and a second member 20 overlap with each other. FIG. 2 is a second schematic plan view illustrating the demarcating member 1. FIG. 2 schematically shows a state in which the first member 10 and the second member 20 do not overlap with each other. FIG. 3 is a schematic cross-sectional view taken along the line of FIG. 1. FIG. 3 schematically shows both states in which the first member 10 and the second member 20 overlap and do not overlap with each other.

As shown in FIG. 1 to FIG. 3, the demarcating member 1 includes the first member 10 and the second member 20. The second member 20 can overlie a portion of the first member 10. The portion of the second member 20 overlying the portion of the first member 10 may or may not be bonded to the first member 10.

In the case in which the second member 20 is bonded to the first member 10, the second member 20 and the first member 10 can be bonded together with an adhesive or the like. In the case in which the second member 20 is not bonded to the first member 10, the second member 20 may or may not be in contact with a portion or the whole of the first member 10 overlapping with the second member 20.

The first member 10 includes a plurality of recessed first demarcating portions 11 arranged in the row and column directions and one or more recessed second demarcating portions 12 adjacent to the outermost column of the first demarcating portions 11 on the X+ side. In the first member 10, the number of the first demarcating portions 11 arranged in the row and column directions is plural. The numbers of first demarcating portions 11 arranged in row directions may be the same or different. In the example shown in FIG. 1 to FIG. 3, a plurality of square first demarcating portions 11 are arranged in four columns and three rows in a plan view. In FIG. 1, the row direction is the X direction, the column direction is the Y direction, and the direction perpendicular to the X direction and the Y direction is the Z direction.

In the first member 10, the number of the one or more second demarcating portions 12 is equal to or less than the number of the first demarcating portions 11 arranged in the column direction. As for the one or more second demarcating portions 12, in the example shown in FIG. 1 to FIG. 3, the first member 10 includes one rectangular second demarcating portion 12 the longitudinal direction of which is the Y direction in a plan view. In the example shown in FIG. 1 to FIG. 3, the length of a long side of the rectangular second demarcating portion 12 is shorter than four times the length of a side of one square first demarcating portion 11. The length of a short side of the rectangular second demarcating portion 12 is shorter than the length of a side of the square first demarcating portion 11.

Each first demarcating portion 11 includes first inclined portions 1s, a first bottom portion 1b continuous with the lower ends of the first inclined portions 1s, and a light source arrangement opening 1e located at the center of the first bottom portion 1b.

In FIG. 2, each first demarcating portion 11 includes four first inclined portions 1s. The first inclined portions 1s are respectively located at the outer edges on the X+ side, the X− side, the Y+ side, and the Y− side of the first bottom portion 1b. That is, the four first inclined portions 1s surround the first bottom portion 1b. The distance between opposite first inclined portions 1s decreases toward the lower end side (first bottom portion 1b side) in a cross-sectional view. For example, the first bottom portion 1b is square in a plan view. The light source arrangement opening 1e is a region in which a light source can be arranged. The light source arrangement opening 1e is located at the center of the first bottom portion 1b and does not reach the lower ends of the first inclined portions 1s. For example, the light source arrangement opening 1e is circular in a plan view.

The second demarcating portion 12 includes second inclined portions 2s and a first opening 1a reaching at least a portion of the lower ends of the second inclined portions 2s in a plan view. In other words, at least a portion of the first bottom portion 1b is spaced apart from the lower ends of the second inclined portions 2s.

In the example shown in FIG. 1 to FIG. 3, the first opening 1a reaches the entire lower ends of the second inclined portions 2s in a plan view. That is, the second demarcating portion 12 includes no bottom portion. The first opening 1a has a rectangular shape the longitudinal direction of which is the Y direction in a plan view. In the example shown in FIG. 1 to FIG. 3, the width in the Y direction of the second inclined portion 2s located at the outer edge of the first opening 1a on the Y+ side, the width in the Y direction of the second inclined portion 2s located at the outer edge of the first opening 1a on the Y− side, and the width in the X direction of the second inclined portion 2s located at the outer edge of the first opening 1a on the X+ side are less than the width in the X direction of the second inclined portion 2s located at the outer edge of the first opening 1a on the X− side in a plan view. The height from the lower end to the upper end of the second inclined portion 2s located at the outer edge of the first opening 1a on the Y+ side, the height from the lower end to the upper end of the second inclined portion 2s located at the outer edge of the first opening 1a on the Y− side, and the height from the lower end to the upper end of the second inclined portion 2s located at the outer edge of the first opening 1a on the X+ side are less than the height from the lower end to the upper end of the second inclined portion 2s located at the outer edge of the first opening 1a on the X− side.

The second member 20 includes third inclined portions 3s, second bottom portions 2b, fourth inclined portions 4s, and third bottom portions 3b and has light source arrangement openings 2e and 3e. In the example shown in FIG. 1 and FIG. 2, the length of the second member 20 in the Y direction is substantially equal to the length of a column of first demarcating portions 11 of the first member 10 in the Y direction.

The third inclined portions 3s can overlie the second inclined portions 2s of the second demarcating portion 12 of the first member 10. The second bottom portions 2b are continuous with the lower ends of the third inclined portions 3s and can be located inside the first opening 1a. In the example shown in FIG. 1 to FIG. 3, the second bottom portions 2b are square. The lower ends of the third inclined portions 3s are in contact with three sides other than the side on the X− side among the four sides of each square second bottom portion 2b. The area of the upper surface of the second bottom portion 2b is substantially equal to the area of the upper surface of the first bottom portion 1b.

Each of the third inclined portions 3s located at the outer edges of the second bottom portions 2b on the X+ side can overlie the second inclined portion 2s located at the outer edge of the first opening 1a on the X+ side. The third inclined portion 3s located at the outer edge of the second bottom portion 2b on the Y+ side can overlie the second inclined portion 2s located at the outer edge of the first opening 1a on the Y+ side. The third inclined portion 3s located at the outer edge of the second bottom portion 2b on the Y− side can overlie the second inclined portion 2s located at the outer edge of the first opening 1a on the Y− side.

The fourth inclined portions 4s are arranged adjacent to the X+ side of the third inclined portions 3s located at the outer edges of the second bottom portions 2b on the X+ side. The fourth inclined portions 4s do not overlap with the second inclined portions 2s of the second demarcating portion 12 of the first member 10. The third bottom portions 3b are continuous with the lower ends of the fourth inclined portions 4s. In the example shown in FIG. 1 to FIG. 3, the third bottom portions 3b are square, and the lower ends of the fourth inclined portions 4s are in contact with three sides other than the side on the X+ side among the four sides of the square shape. The area of the upper surface of each third bottom portion 3b is substantially equal to the area of the upper surface of each first bottom portion 1b and the area of the upper surface of each second bottom portion 2b.

The demarcating member 1 can be disposed on a substrate. The lower surfaces of the first bottom portions 1b can be bonded to the substrate. The second bottom portions 2b are located inside the first opening 1a, and the lower surfaces of the second bottom portions 2b are bonded to the substrate. The light sources can be respectively disposed on the substrate exposed inside the light source arrangement openings 1e of the first bottom portions 1b, the substrate exposed inside the light source arrangement openings 2e of the second bottom portions 2b, and the substrate exposed inside the light source arrangement openings 3e of the third bottom portions 3b.

In the case in which the demarcating member 1 is light-reflective, the first inclined portions 1s, the first bottom portions 1b, the third inclined portions 3s, the second bottom portions 2b, the fourth inclined portions 4s, and the third bottom portions 3b serve as reflective members that reflect light from the light sources. That is, the demarcating member 1 can be used as a reflector for the surface light source.

The expression "disposed on the substrate" implies both the case in which the demarcating member and the like are directly disposed on the upper surface of the substrate and the case in which the demarcating member and the like are indirectly disposed with a covering member to be described below or the like therebetween. The expression "bonded to the substrate" implies both the case in which the demarcating member and the like are directly bonded to the upper surface of the substrate and the case in which the demarcating member and the like are indirectly bonded to the substrate with the covering member to be described below or the like therebetween.

In the case in which the demarcating member 1 is disposed on the substrate and in which the light sources are disposed on the substrate exposed inside respective light source arrangement openings, the demarcating member 1 may contract with heat generated when the light source is driven or the like. The contraction of the demarcating member 1 is greater than the contraction of the substrate. The demarcating member 1 includes the first member 10 and the second member 20 each of which contracts.

The first member 10 and the second member 20 contract toward the respective centers. The larger the member is in a plan view, the greater the contraction is. As for the demarcating member 1, the first member 10 is larger than the second member 20 in a plan view and contracts more greatly than the second member 20. The second member 20 is smaller than the first member 10 in a plan view and contracts less than the first member 10. Further, the contraction of the second member 20 with heat is further reduced because the lower surfaces of the second bottom portions 2b of the second member 20 are bonded to the substrate. The lower surfaces of the third bottom portions 3b of the second member 20 may be bonded to the substrate.

The portion of the first member 10 on the second demarcating portion 12 side is about to contract in a direction (X− direction in a cross-sectional view) away from the second member 20 with heat generated when the light source is driven or the like. However, in the demarcating member 1 in which the second member 20 is bonded to the substrate, with the third inclined portions 3s overlying the second inclined portions 2s, the first member 10 can be prevented from contracting in the direction away from the second member 20. This allows for reducing the contraction of both the first member 10 and the second member 20 with heat, so that deformation of the first member 10 and the second member 20 can be reduced. Accordingly, in the case in which the first member 10 and the second member 20 are used as reflectors for the surface light source, changes in the direction of reflection of light can be reduced, so that luminance unevenness can be reduced.

Figure 4:
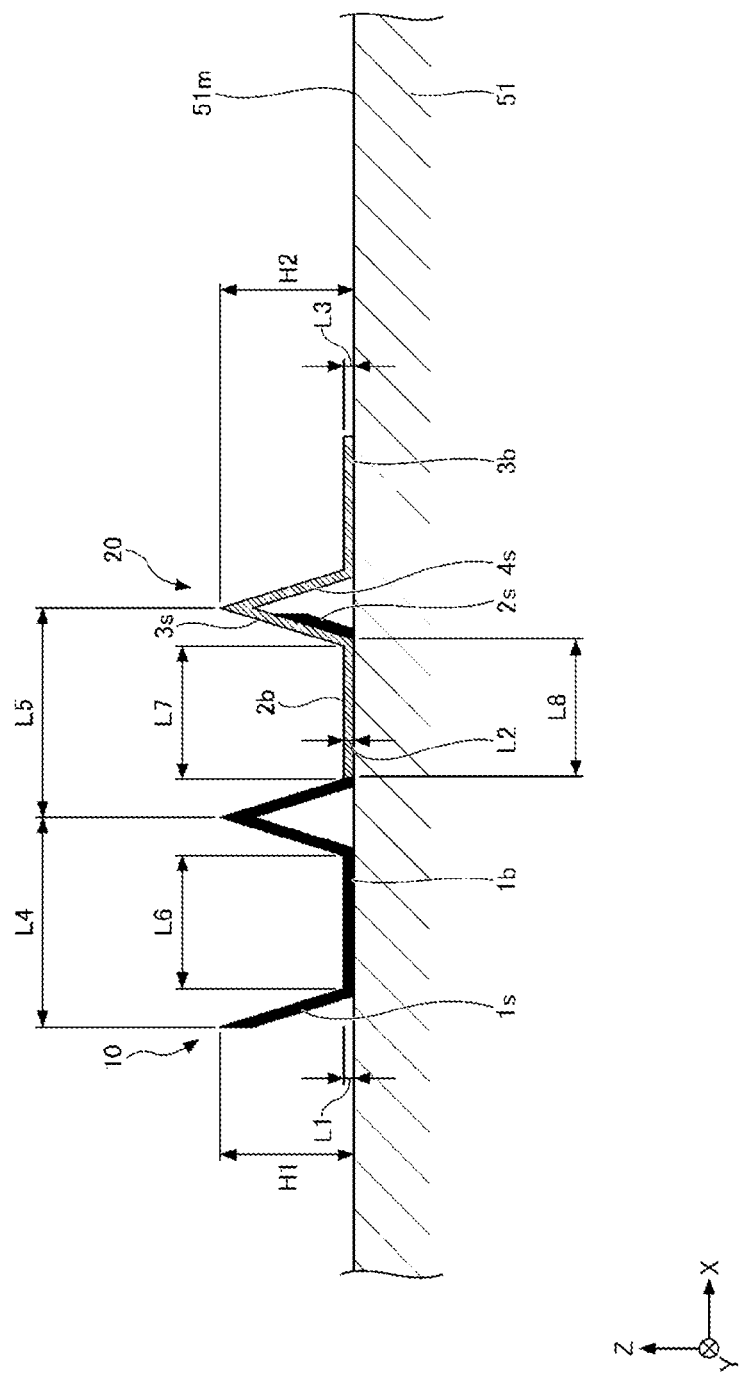
FIG. 4 is an exemplary schematic diagram illustrating heights of inclined portions and the like according to an exemplary embodiment of the present disclosure.

FIG. 4 is a schematic diagram illustrating heights of the inclined portions and the like. In the case in which the demarcating member 1 is disposed on a substrate 51, a height H1 from an upper surface 51m of the substrate 51 to the upper end of the first inclined portion 1s is preferably equal to a height H2 from the upper surface 51m of the substrate 51 to the upper ends of the third inclined portion 3s and the fourth inclined portion 4s. In order to make the height H1 and the height H2 equal, for example, the height of the second inclined portions 2s underlying the third inclined portions 3s is caused to be less than the height of the second inclined portions 2s not overlapping with the third inclined portions 3s. A distance L1 from the upper surface 51m of the substrate 51 to the upper surfaces of the first bottom portions 1b, a distance L2 from the upper surface 51m of the substrate 51 to the upper surfaces of the second bottom portions 2b, and a distance L3 from the upper surface 51m of the substrate 51 to the upper surfaces of the third bottom portions 3b are preferably equal to one another.

A distance L4 between the upper ends of the first inclined portions 1s in the X direction is preferably equal to a distance L5 between the upper end of the second inclined portion 2s not overlapping with the second member 20 and the intersection point of the upper ends of the third inclined portion 3s and the fourth inclined portion 4s in the X direction. A distance L6 of the first bottom portion 1b in the X direction is preferably equal to a distance L7 of the second bottom portion 2b in the X direction. In order to make the distance L7 equal to the distance L6, a distance L8 between the lower end of the second inclined portion 2s not overlapping with the second member 20 and the lower end of the second inclined portion 2s overlapping with the second member 20 in the X direction is caused to be longer than the distance L7.

With the relationship between the height H1 and the height H2 and the relationship between the distance L1 to the distance L8 as described above, luminance unevenness can be reduced in the case in which the demarcating member 1 is used as a reflector for the surface light source. Suitable sizes, materials, and the like for the demarcating member will be described below in detail.

Demarcating Member 1A

Figure 5:
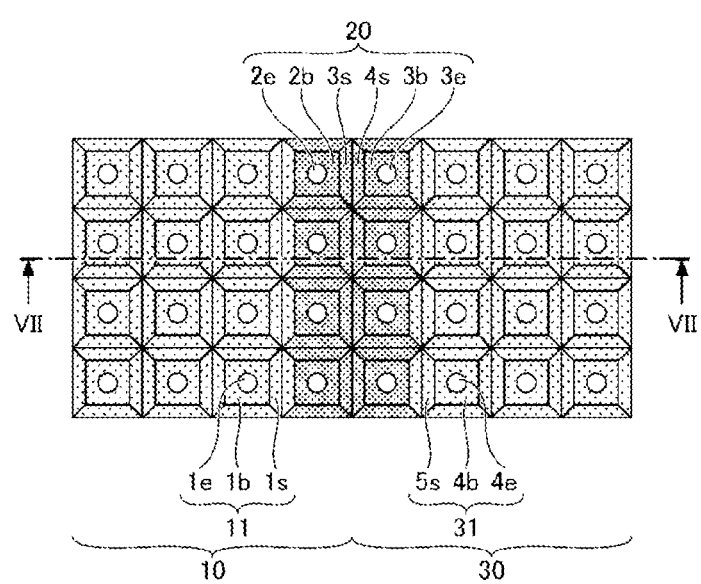
FIG. 5 is a first exemplary schematic plan view illustrating an exemplary demarcating member 1A.
Figure 6:
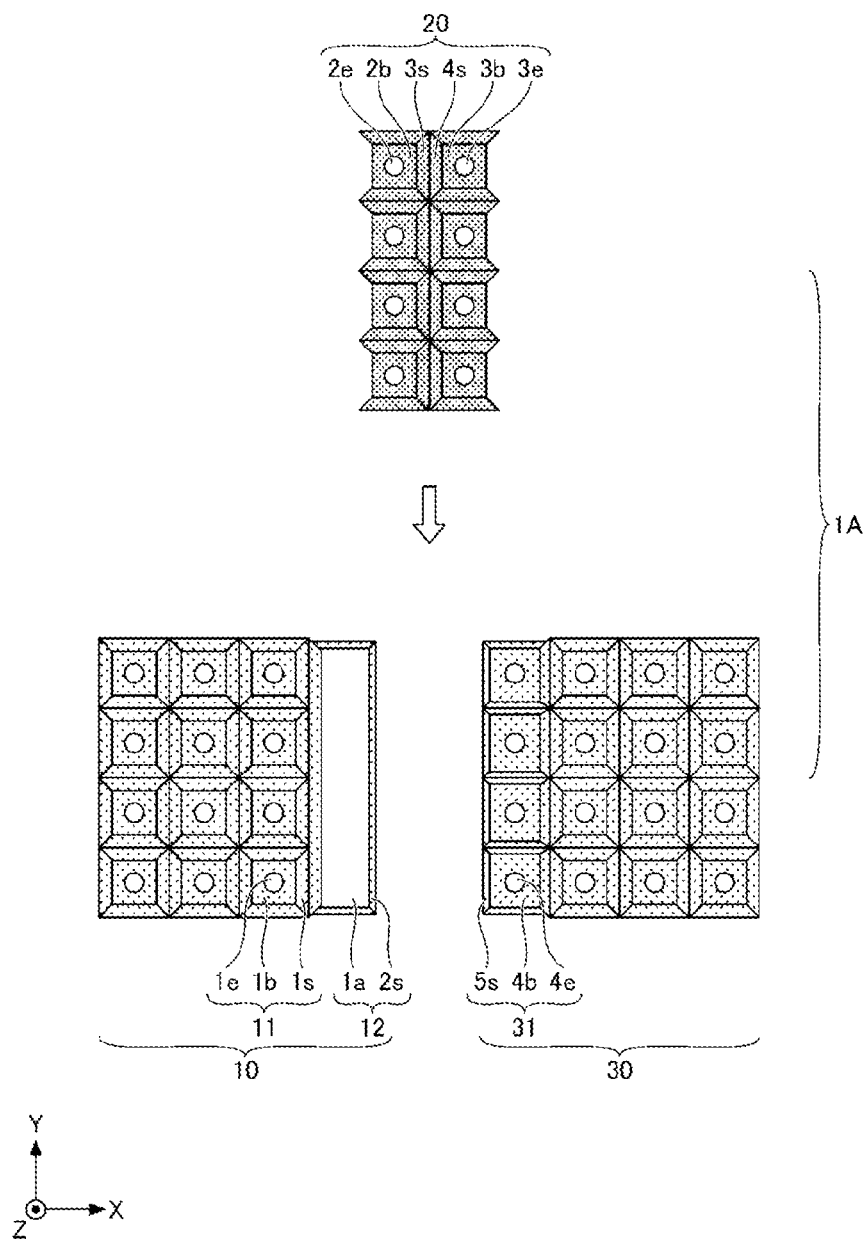
FIG. 6 is a second exemplary schematic plan view illustrating the exemplary demarcating member 1A.
Figure 7:
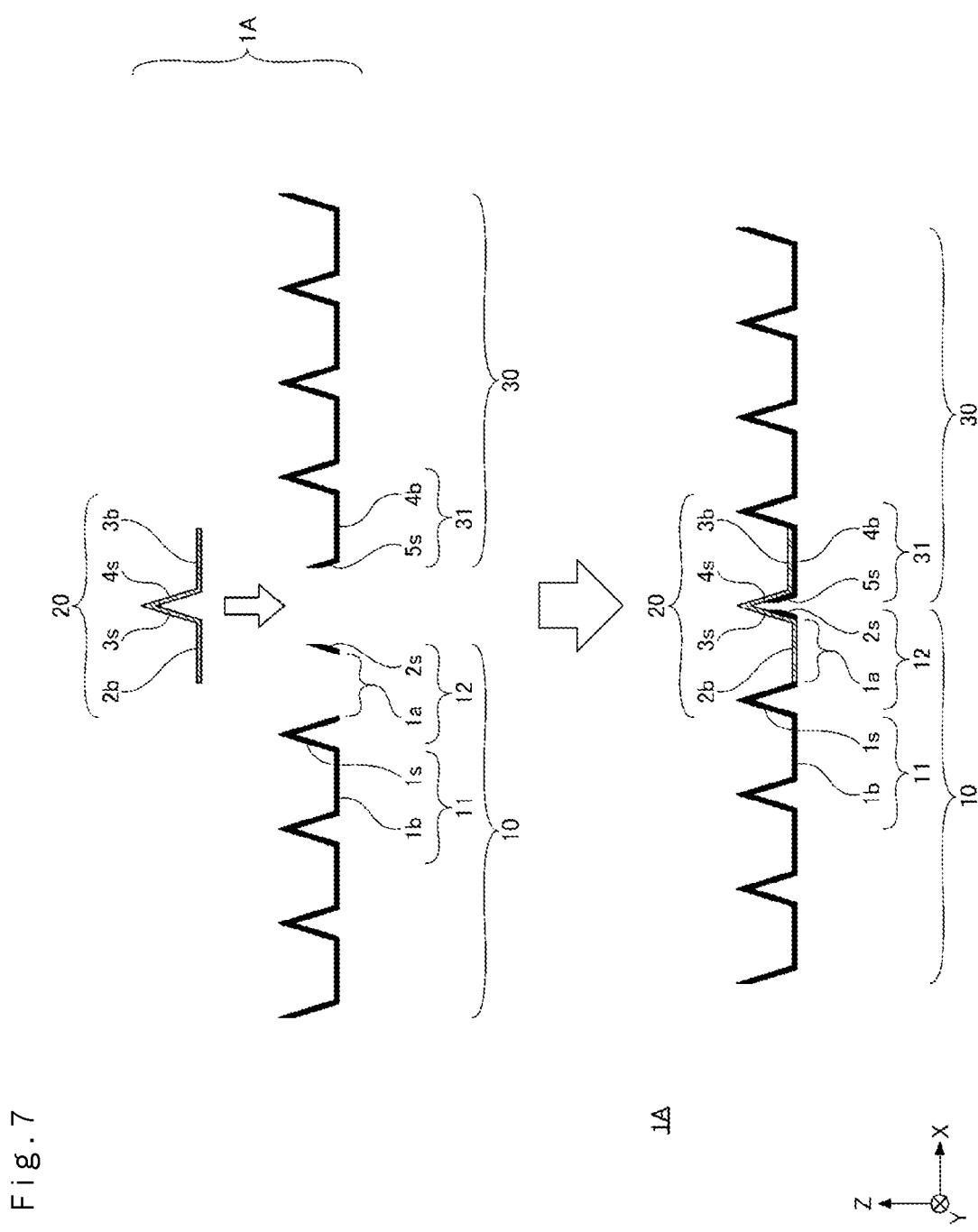
FIG. 7 is a schematic cross-sectional view taken along the line VII-VII of FIG. 5.

A demarcating member 1A is another example of the demarcating member. FIG. 5 is a first schematic plan view illustrating the demarcating member 1A. FIG. 5 schematically shows a state in which the first member 10 and a third member 30 overlap with the second member 20. FIG. 6 is a second schematic plan view illustrating the demarcating member 1A. FIG. 6 schematically shows a state in which the first member 10 and the third member 30 do not overlap with the second member 20. FIG. 7 is a schematic cross-sectional view taken along the line VII-VII of FIG. 5. FIG. 7 schematically shows both states in which the first member 10 and the third member 30 overlap and do not overlap with the second member 20.

As shown in FIG. 5 to FIG. 7, the demarcating member 1A includes the first member 10, the second member 20, and the third member 30. The second member 20 can overlie portions of the first member 10 and the third member 30. The portions of the second member 20 overlying the portions of the first member 10 and the third member 30 may or may not be bonded to the first member 10 and the third member 30. In the case in which the second member 20 is bonded to the first member 10 and the third member 30, the second member 20 can be bonded to the first member 10 and the third member 30 with an adhesive or the like. In the case in which the second member 20 is not bonded to the first member 10 and the third member 30, part or the whole of the portions in which the second member 20 overlaps with the first member 10 and the third member 30 may or may not be in contact.

The third member 30 includes one or more recessed third demarcating portions 31 located in the outermost column on the first member 10 side and underlies a portion of the second member 20. In the demarcating member 1A, the number of the third demarcating portions 31 is plural. The numbers of third demarcating portions 31 arranged in row directions may be the same or different. In the example shown in FIG. 5 to FIG. 7, a plurality of square third demarcating portions 31 are arranged in four rows and four columns in a plan view.

Each third demarcating portion 31 includes fifth inclined portions 5s, a fourth bottom portion 4b continuous with the lower ends of the fifth inclined portions 5s, and a light source arrangement opening 4e located at the center of the fourth bottom portion 4b.

Four fifth inclined portions 5s surround each fourth bottom portion 4b. The distance between opposite fifth inclined portions 5s decreases toward the lower end side (fourth bottom portion 4b side) in a cross-sectional view. For example, the fourth bottom portion 4b is square in a plan view. The light source arrangement opening 4e is a region in which a light source can be arranged. The light source arrangement opening 4e located at the center of the fourth bottom portion 4b does not reach the lower ends of the fifth inclined portions 5s. For example, the light source arrangement opening 4e is circular in a plan view.

In the demarcating member 1A, in a portion of the third member 30 that the second member 20 overlies, the lengths in the X direction and the Y direction of each third demarcating portion 31 in the outermost column on the X− side, the width from the lower end to the upper end of the fifth inclined portion 5s in a plan view, and the like may be adjusted. In the example shown in FIG. 6, in each third demarcating portion 31 in the outermost column on the X− side, the width in the Y direction of the fifth inclined portion 5s located at the outer edge of the fourth bottom portion 4b on the Y+ side, the width in the Y direction of the fifth inclined portion 5s located at the outer edge of the fourth bottom portion 4b on the Y− side, and the width in the X direction of the fifth inclined portion 5s located at the outer edge of the fourth bottom portion 4b on the X− side are less than the width in the X direction of the fifth inclined portion 5s located at the outer edge of the fourth bottom portion 4b on the X+ side in a plan view. In each third demarcating portion 31 in the outermost column on the X− side, the height from the lower end to the upper end of the fifth inclined portion 5s located at the outer edge of the fourth bottom portion 4b on the Y+ side, the height from the lower end to the upper end of the fifth inclined portion 5s located at the outer edge of the fourth bottom portion 4b on the Y− side, and the height from the lower end to the upper end of the fifth inclined portion 5s located at the outer edge of the fourth bottom portion 4b on the X− side are less than the height from the lower end to the upper end of the fifth inclined portion 5s located at the outer edge of the fourth bottom portion 4b on the X+ side. The area of the fourth bottom portion 4b of each third demarcating portion 31 in the outermost column on the X− side is greater than the area of the fourth bottom portion 4b of each third demarcating portion 31 in another column.

The third inclined portions 3s are the same as in the demarcating member 1, and the description is not repeated. Each of the fourth inclined portions 4s located at the outer edges of the third bottom portions 3b on the X− side can overlie the fifth inclined portion 5s located at the outer edge on the first member 10 side. The fourth inclined portion 4s the lower end of which is in contact with the side of each third bottom portion 3b on the Y+ side can overlie the fifth inclined portion 5s the lower end of which is in contact with the side of the fourth bottom portion 4b on the Y+ side of each third demarcating portion 31 in the outermost column on the X− side. The fourth inclined portion 4s the lower end of which is in contact with the side of each third bottom portion 3b on the Y− side can overlie the fifth inclined portion 5s the lower end of which is in contact with the side of the fourth bottom portion 4b on the Y− side of each third demarcating portion 31 in the outermost column on the X− side. Each third bottom portion 3b can overlie the fourth bottom portion 4b of each third demarcating portion 31 in the outermost column on the X− side.

The demarcating member 1A can be disposed on the substrate. The lower surfaces of the first bottom portions 1b and the lower surfaces of the fourth bottom portions 4b can be bonded to the substrate. The second bottom portions 2b are located inside the first opening 1a, and the lower surfaces of the second bottom portions 2b are bonded to the substrate. The light sources can be respectively disposed on the substrate exposed inside the light source arrangement openings 1e of the first bottom portions 1b, the substrate exposed inside the light source arrangement openings 2e of the second bottom portions 2b, the substrate exposed inside the light source arrangement openings 3e of the third bottom portions 3b, and the substrate exposed inside the light source arrangement openings 4e of the fourth bottom portions 4b.

In the case in which the demarcating member 1A is light-reflective, the demarcating member 1A can be used as a reflector for the surface light source. In the case in which the demarcating member 1A is used as the reflector for the surface light source, the height from the upper surface of the substrate to the upper ends of the first inclined portions 1s, the height from the upper surface of the substrate to the upper ends of the third inclined portions 3s, the height from the upper surface of the substrate to the upper ends of the fourth inclined portions 4s, and the height from the upper surface of the substrate to the upper ends of the fifth inclined portions 5s not overlapping with the second member 20 are preferably equal to one another. The distance from the upper surface of the substrate to the upper surfaces of the first bottom portions 1b, the distance from the upper surface of the substrate to the upper surfaces of the second bottom portions 2b, the distance from the upper surface of the substrate to the upper surfaces of the third bottom portions 3b, and the distance from the upper surface of the substrate to the upper surfaces of the fourth bottom portions 4b are preferably equal to one another.

In a portion in which a third bottom portion 3b and a fourth bottom portion 4b overlap with each other, each of the third bottom portion 3b and a fourth bottom portion 4b may have a thickness to be, for example, half the thickness of the other bottom portion. This structure causes the distance from the upper surface of the substrate to the upper surface of the third bottom portion 3b in the portion in which the third bottom portion 3b and the fourth bottom portion 4b overlap with each other to be equal to the distance from the upper surface of the substrate to the upper surface of the first bottom portion 1b or the like, so that the luminance unevenness can be reduced in the case in which the demarcating member 1A is used as a reflector for the surface light source.

In the case in which the demarcating member 1A is disposed on the substrate and in which the light source is disposed on the substrate exposed inside each light source arrangement opening, the portion of the first member 10 on the second demarcating portion 12 side is about to contract in a direction (X− direction) away from the second member 20 with heat generated when the light source is driven or the like. Each of the third demarcating portions 31 located on the first member 10 side of the central portion of the third member 30 in the X direction is about to contract in a direction (X+ direction) away from the second member 20 with heat generated when the light source is driven or the like. However, in the demarcating member 1A in which the second member 20 is bonded to the substrate, with the third inclined portions 3s overlying the second inclined portions 2s, the first member 10 is prevented from contracting in the direction away from the second member 20, and with the fourth inclined portions 4s overlying the fifth inclined portions 5s, the third member 30 can be prevented from contracting in the direction away from the second member 20. This allows for reducing the contraction of all the first member 10, the second member 20, and the third member 30 with heat, so that deformation of the first member 10 and the second member 20 can be reduced. Accordingly, in the case in which the first member 10 and the second member 20 are used as reflectors for the surface light source, changes in the direction of reflection of light can be reduced, so that luminance unevenness can be reduced.

Demarcating Member 1B

Figure 8:
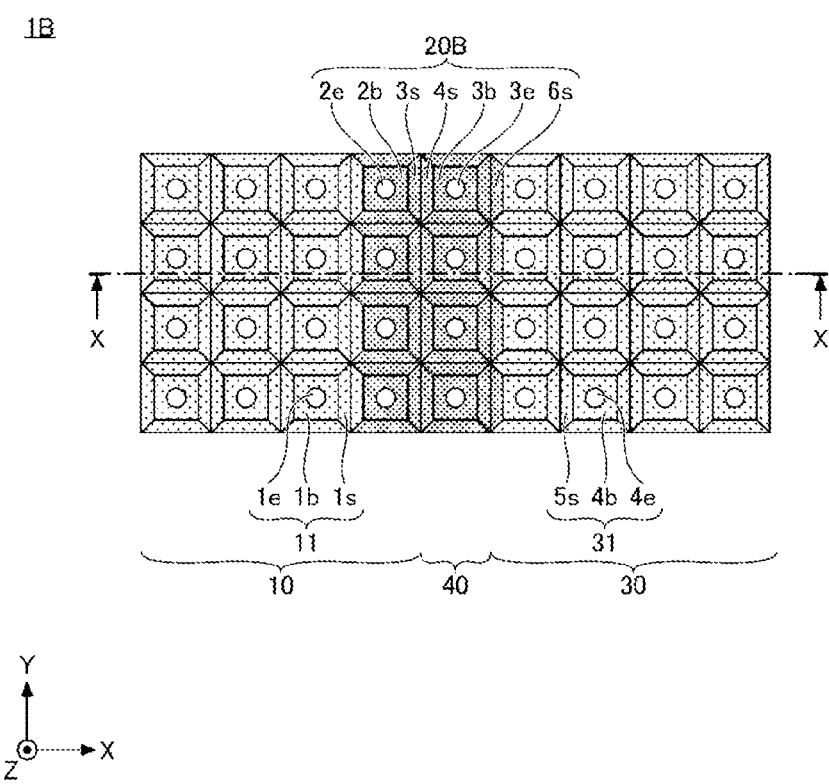
FIG. 8 is a first exemplary schematic plan view illustrating an exemplary demarcating member 1B.
Figure 9:
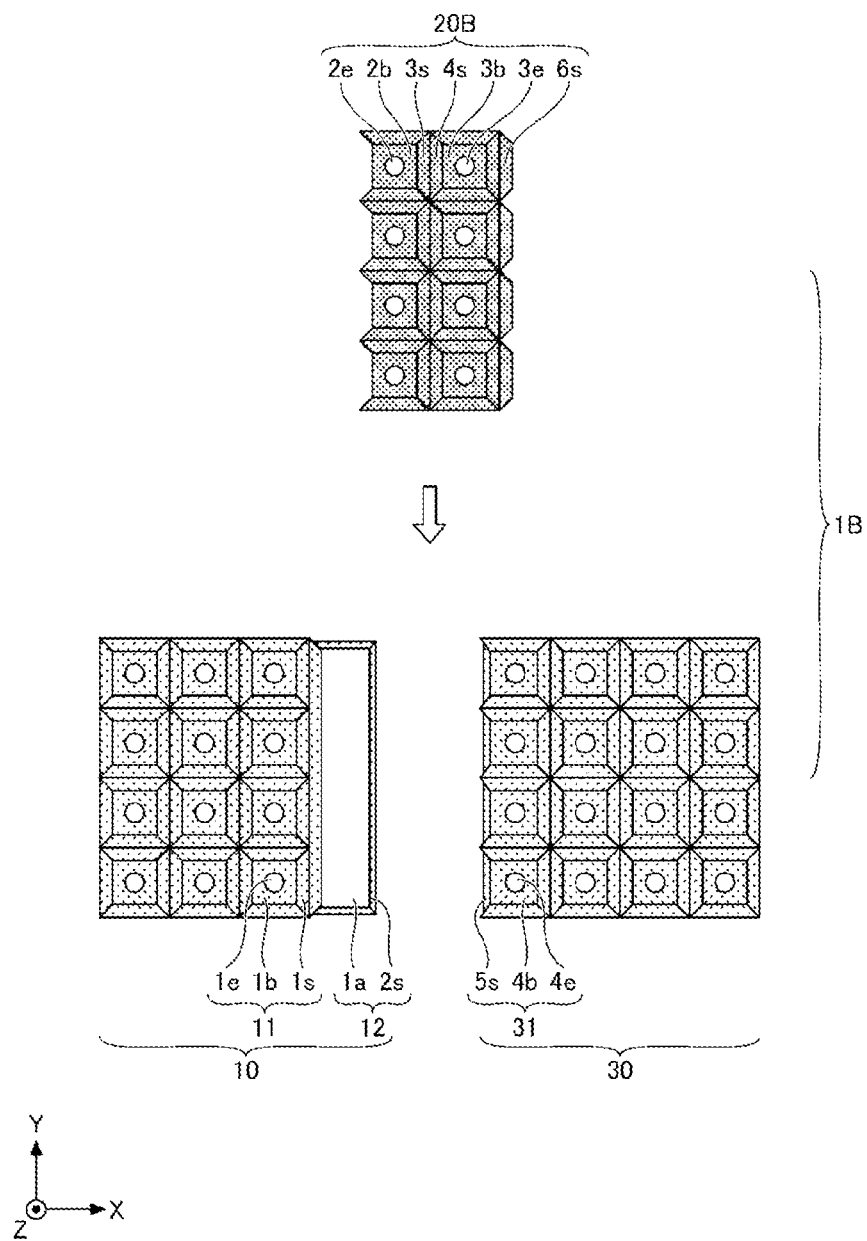
FIG. 9 is a second exemplary schematic plan view illustrating the exemplary demarcating member 1B.
Figure 10:
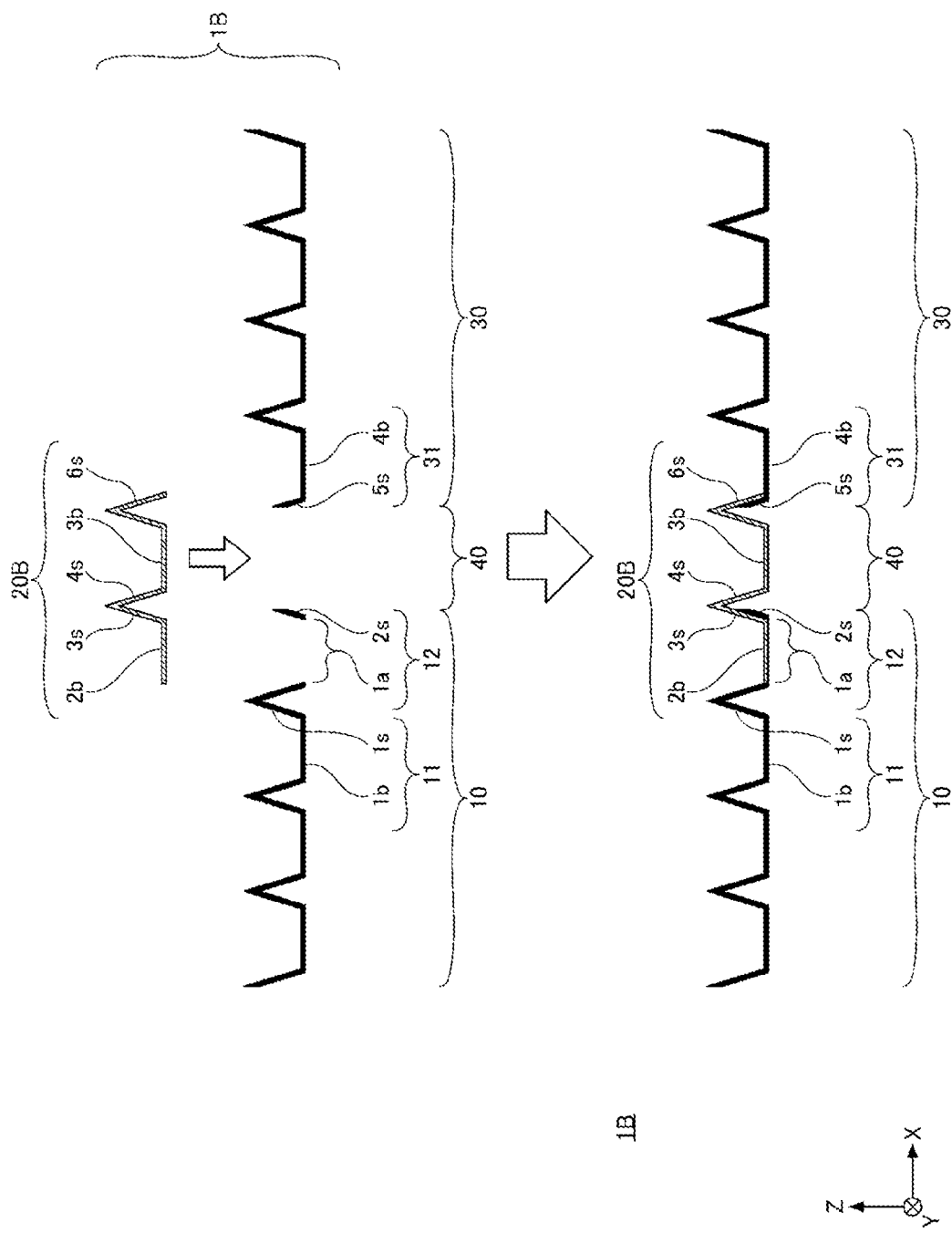
FIG. 10 is a schematic cross-sectional view taken along the line X-X of FIG. 8.

A demarcating member 1B is still another example of the demarcating member. FIG. 8 is a first schematic plan view illustrating the demarcating member 1B. FIG. 8 schematically shows a state in which the first member 10 and the third member 30 overlap with a second member 20B. FIG. 9 is a second schematic plan view illustrating the demarcating member 1B. FIG. 9 schematically shows a state in which the first member 10 and the third member 30 do not overlap with the second member 20B. FIG. 10 is a schematic cross-sectional view taken along the line X-X of FIG. 8. FIG. 10 schematically shows both states in which the first member 10 and the third member 30 overlap and do not overlap with the second member 20B.

As shown in FIG. 8 to FIG. 10, the demarcating member 1B includes the first member 10, the second member 20B, and the third member 30. The second member 20B can overlie portions of the first member 10 and the third member 30. The portions of the second member 20B overlying the portions of the first member 10 and the third member 30 may or may not be bonded to the first member 10 and the third member 30. In the case in which the second member 20B is bonded to the first member 10 and the third member 30, the second member 20B can be bonded to the first member 10 and the third member 30 with an adhesive or the like. In the case in which the second member 20B is not bonded to the first member 10 and the third member 30, part or the whole of the portions in which the second member 20B overlaps with the first member 10 and the third member 30 may or may not be in contact.

The demarcating member 1B includes a spacing portion 40 between the first member 10 and the third member 30. In other words, the first member 10 and the third member 30 face each other with the spacing portion 40 therebetween. The spacing portion 40 is a space in which the first member 10 and the third member 30 are spaced apart from each other at a distance equal to or longer than a length that allows a single demarcating portion constituted of the third bottom portion 3b of the second member 20B, the fourth inclined portion 4s located at the outer edge of the third bottom portion 3b on the X− side, and the fourth inclined portion 4s located at the outer edge of the third bottom portion 3b on the X+ side to be disposed between the members in a cross-sectional view. The space (gap) between the second inclined portion 2s and the fifth inclined portion 5s in the portion overlapping with the second member 20 in a cross-sectional view in the demarcating member 1A shown in FIG. 7 does not correspond to the spacing portion because the length is less than the length corresponding to a single demarcating portion. For example, the length of the spacing portion 40 in the X direction may be equal to the length between the upper end of the second inclined portion 2s overlapping with the second member 20B and the upper end of the fifth inclined portion 5s overlapping with the second member 20B in the X direction or may be greater than the length between the upper end of the second inclined portion 2s overlapping with the second member 20B and the upper end of the fifth inclined portion 5s overlapping with the second member 20B in the X direction as shown in FIG. 2.

In the demarcating member 1B, in a portion of the third member 30 that the second member 20B overlies, the lengths in the X direction and the Y direction of each third demarcating portion 31 in the outermost column on the X− side, the width from the lower end to the upper end of the fifth inclined portion 5s in a plan view, and the like may be adjusted. In the example shown in FIG. 9, in each third demarcating portion 31 in the outermost column on the X− side, the width in the X direction of the fifth inclined portion 5s located at the outer edge of the fourth bottom portion 4b on the X− side is less than the width in the Y direction of the fifth inclined portion 5s located at the outer edge of the fourth bottom portion 4b on the Y+ side, the width in the Y direction of the fifth inclined portion 5s located at the outer edge of the fourth bottom portion 4b on the Y− side, and the width in the X direction of the fifth inclined portion 5s located at the outer edge of the fourth bottom portion 4b on the X+ side in a plan view. In each third demarcating portion 31 in the outermost column on the X− side, the height from the lower end to the upper end of the fifth inclined portion 5s located at the outer edge of the fourth bottom portion 4b on the X− side is less than the height from the lower end to the upper end of the fifth inclined portion 5s located at the outer edge of the fourth bottom portion 4b on the Y+ side, the height from the lower end to the upper end of the fifth inclined portion 5s located at the outer edge of the fourth bottom portion 4b on the Y− side, and the height from the lower end to the upper end of the fifth inclined portion 5s located at the outer edge of the fourth bottom portion 4b on the X+ side.

The second member 20B includes the third inclined portions 3s, the second bottom portions 2b, the fourth inclined portions 4s, the third bottom portions 3b, the light source arrangement openings 2e and 3e, and sixth inclined portions 6s. In the example shown in FIG. 8 and FIG. 9, the length of the second member 20B in the Y direction is substantially equal to the length of one column of the first demarcating portions 11 of the first member 10 in the Y direction and the length of one column of the third demarcating portions 31 of the third member 30 other than the outermost column on the X− side in the Y direction.

The third inclined portions 3s are the same as in the demarcating member 1, and the description is not repeated. The fourth inclined portions 4s surround the third bottom portions 3b, and the sixth inclined portions 6s are adjacent to the fourth inclined portions 4s located at the outer edges on the third member 30 side. Each of the sixth inclined portions 6s can overlie the fifth inclined portion 5s located at the outer edge on the first member 10 side. Each third bottom portion 3b can be located inside the spacing portion 40.

The demarcating member 1B can be disposed on the substrate. In the case in which the demarcating member 1B is light-reflective, the demarcating member 1B can be used as a reflector for the surface light source. In the case in which the demarcating member 1B is disposed on the substrate and in which a light source is disposed on the substrate exposed inside each light source arrangement opening, the contraction of all the first member 10, the second member 20B, and the third member 30 with heat generated when the light source is driven is reduced, so that deformation of the first member 10, the second member 20B, and the third member 30 can be reduced. Accordingly, in the case in which the first member 10, the second member 20B, and the third member 30 are used as reflectors for the surface light source, changes in the direction of reflection of light can be reduced, so that luminance unevenness can be reduced.

In the case in which the demarcating member 1B is used as the reflector for the surface light source, the height from the upper surface of the substrate to the upper ends of the first inclined portions 1s, the height from the upper surface of the substrate to the upper ends of the third inclined portions 3s, the height from the upper surface of the substrate to the upper ends of the fourth inclined portions 4s, the height from the upper surface of the substrate to the upper ends of the fifth inclined portions 5s not overlapping with the second member 20B, and the height from the upper surface of the substrate to the upper ends of the sixth inclined portions 6s are preferably equal to one another.

In the example shown in FIG. 8 to FIG. 10, the length of the spacing portion 40 in the X direction is a length that allows a single demarcating portion constituted of a third bottom portion 3b, the fourth inclined portion 4s located at the outer edge of the third bottom portion 3b on the X− side, and the fourth inclined portion 4s located at the outer edge of the third bottom portion 3b on the X+ side to be disposed in the spacing portion 40 but is not limited to this length. The length of the spacing portion 40 in the X direction may be a length that allows n demarcating portions each constituted of a third bottom portion 3b, the fourth inclined portion 4s located at the outer edge of the third bottom portion 3b on the X− side, and the fourth inclined portion 4s located at the outer edge of the third bottom portion 3b on the X+ side to be disposed in the spacing portion 40.

Demarcating Member 1C

Figure 11:
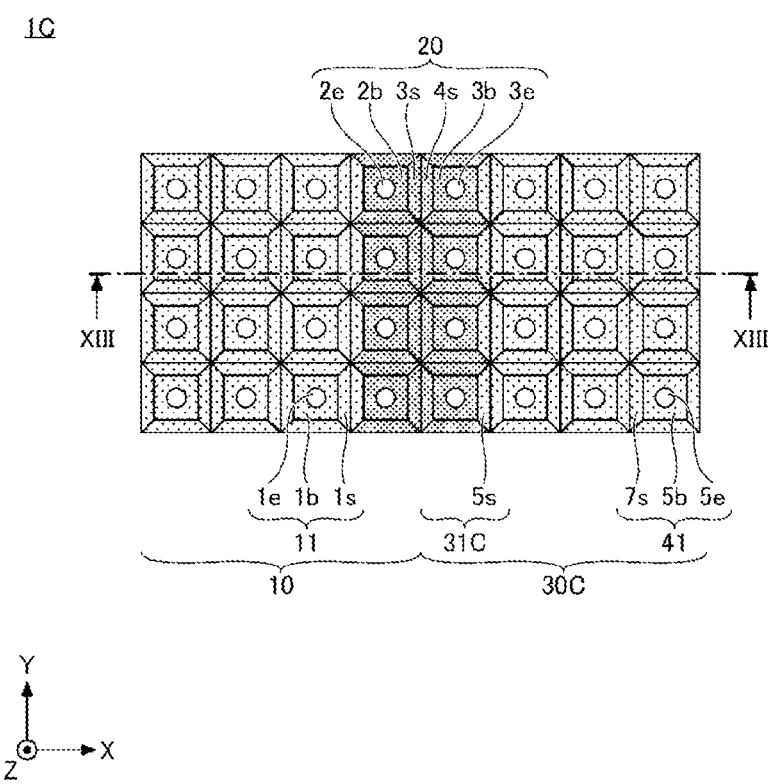
FIG. 11 is a first exemplary schematic plan view illustrating an exemplary demarcating member 1C.
Figure 12:
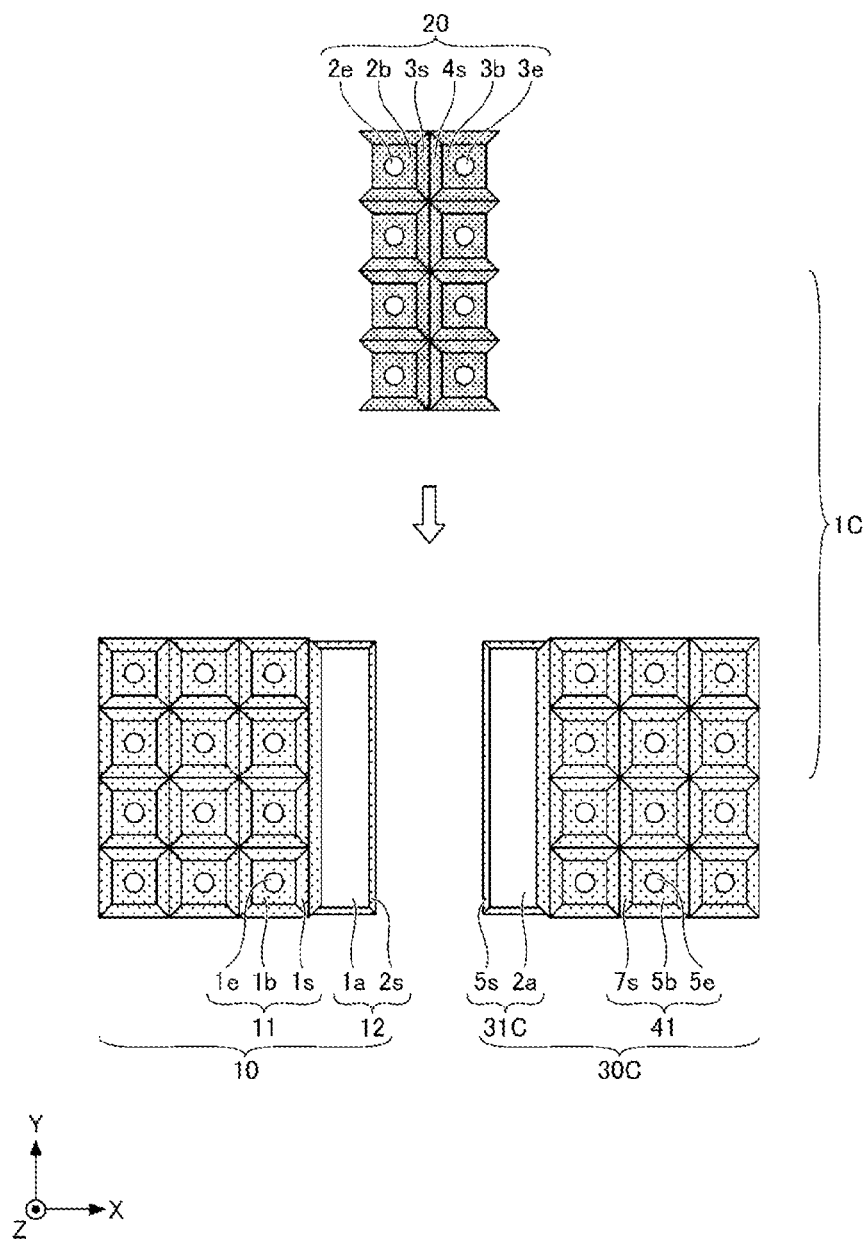
FIG. 12 is a second exemplary schematic plan view illustrating the exemplary demarcating member 1C.
Figure 13:
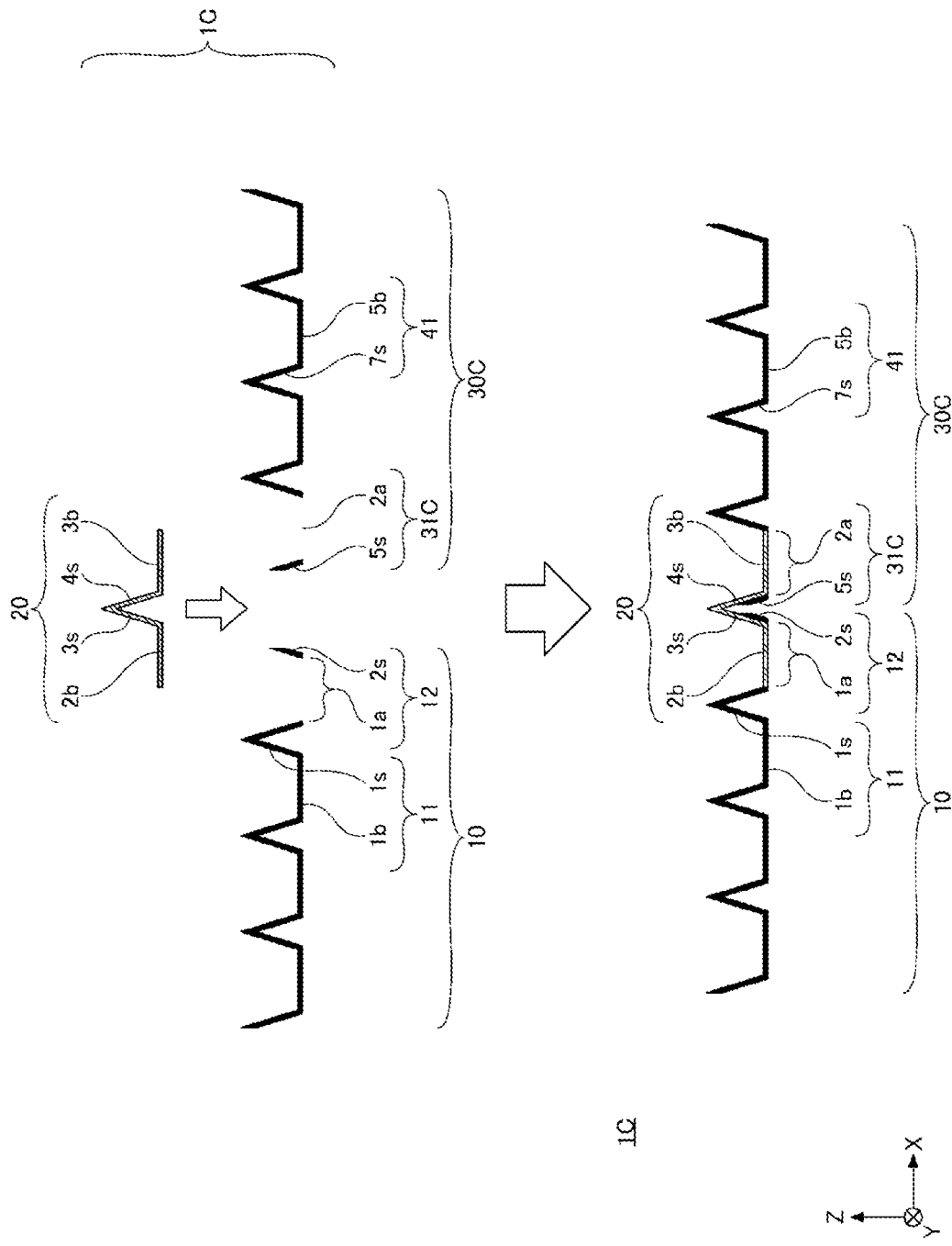
FIG. 13 is a schematic cross-sectional view taken along the line XIII-XIII of FIG. 11.

A demarcating member 1C is still another example of the demarcating member. FIG. 11 is a first schematic plan view illustrating the demarcating member 1C. FIG. 11 schematically shows a state in which the first member 10 and a third member 30C overlap with the second member 20. FIG. 12 is a second schematic plan view illustrating the demarcating member 1C. FIG. 12 schematically shows a state in which the first member 10 and the third member 30C do not overlap with the second member 20. FIG. 13 is a schematic cross-sectional view taken along the line XIII-XIII of FIG. 11. FIG. 13 schematically shows both states in which the first member 10 and the third member 30C overlap and do not overlap with the second member 20.

As shown in FIG. 11 to FIG. 13, the demarcating member 1C includes the first member 10, the second member 20, and the third member 30C. The second member 20 can overlie portions of the first member 10 and the third member 30C.

The portions of the second member 20 overlying the portions of the first member 10 and the third member 30C may or may not be bonded to the first member 10 and the third member 30C. In the case in which the second member 20 is bonded to the first member 10 and the third member 30C, the second member 20 can be bonded to the first member 10 and the third member 30C with an adhesive or the like. In the case in which the second member 20 is not bonded to the first member 10 and the third member 30C, part or the whole of the portions in which the second member 20 overlaps with the first member 10 and the third member 30C may or may not be in contact.

The third member 30C includes a plurality of recessed fourth demarcating portions 41 arranged in the row and column directions and one or more recessed third demarcating portions 31C adjacent to the outermost column of the fourth demarcating portions 41 on the first member 10 side (X− side). In the demarcating member 1C, the number of the fourth demarcating portions 41 arranged in the row and column directions is plural. The numbers of fourth demarcating portions 41 arranged in row directions may be the same or different. As for the fourth demarcating portions 41, in the example shown in FIG. 11 to FIG. 13, square fourth demarcating portions 41 are arranged in four columns and three rows in a plan view.

In the third member 30C, the number of the third demarcating portions 31C is plural. As for the third demarcating portions 31C, in the example shown in FIG. 11 to FIG. 13, the third member 30C includes one rectangular third demarcating portion 31C the longitudinal direction of which is the Y direction in a plan view.

The fourth demarcating portions 41 each include seventh inclined portions 7s, a fifth bottom portion 5b continuous with the lower ends of the seventh inclined portions 7s, and a light source arrangement opening 5e located at the center of the fifth bottom portion 5b.

The seventh inclined portions 7s surround the fifth bottom portion 5b. The distance between opposite seventh inclined portions 7s decreases toward the lower end side (fifth bottom portion 5b side) in a cross-sectional view. For example, the fifth bottom portion 5b is square in a plan view. The light source arrangement opening 5e is a region in which a light source can be arranged. The light source arrangement opening 5e located at the center of the fifth bottom portion 5b does not reach the lower ends of the seventh inclined portions 7s. For example, the light source arrangement opening 5e is circular in a plan view.

The third demarcating portion 31C includes the fifth inclined portions 5s and a second opening 2a reaching at least a portion of the lower ends of the fifth inclined portions 5s in a plan view.

In the example shown in FIG. 11 to FIG. 13, the second opening 2a reaches the entire lower ends of the fifth inclined portions 5s in a plan view. That is, the third demarcating portion 31C includes no bottom portion. The second opening 2a has a rectangular shape the longitudinal direction of which is the Y direction in a plan view.

In the demarcating member 1C, in a portion of the third member 30C that the second member 20 overlies, the lengths in the X direction and the Y direction of the third demarcating portion 31C in the outermost column on the X− side, the width from the lower end to the upper end of the fifth inclined portion 5s in a plan view, and the like may be adjusted. In the example shown in FIG. 12, the width in the Y direction of the fifth inclined portion 5s located at the outer edge of the second opening 2a on the Y+ side, the width in the Y direction of the fifth inclined portion 5s located at the outer edge of the second opening 2a on the Y− side, and the width in the X direction of the fifth inclined portion 5s located at the outer edge of the second opening 2a on the X− side are less than the width in the X direction of the fifth inclined portion 5s located at the outer edge of the second opening 2a on the X+ side in a plan view. The height from the lower end to the upper end of the fifth inclined portion 5s located at the outer edge of the second opening 2a on the Y+ side, the height from the lower end to the upper end of the fifth inclined portion 5s located at the outer edge of the second opening 2a on the Y− side, and the height from the lower end to the upper end of the fifth inclined portion 5s located at the outer edge of the second opening 2a on the X− side are less than the height from the lower end to the upper end of the fifth inclined portion 5s located at the outer edge of the second opening 2a on the X+ side.

The third inclined portions 3s can overlie the second inclined portions 2s of the second demarcating portion 12 of the first member 10. The second bottom portions 2b are continuous with the lower ends of the third inclined portions 3s and can be located inside the first opening 1a. In the example shown in FIG. 11 to FIG. 13, the second bottom portions 2b are square. The lower ends of the third inclined portions 3s are in contact with three sides other than the side on the X− side among the four sides of each square second bottom portion 2b. The area of the upper surface of the second bottom portion 2b is substantially equal to the area of the upper surface of the first bottom portion 1b.

The third inclined portions 3s and the fourth inclined portions 4s are the same as in the demarcating member 1A, and the description is not repeated. The demarcating member 1C can be disposed on the substrate. In the case in which the demarcating member 1C is light-reflective, the demarcating member 1C can be used as a reflector for the surface light source. In the case in which the demarcating member 1C is disposed on the substrate and in which a light source is disposed on the substrate exposed inside each light source arrangement opening, the contraction of all the first member 10, the second member 20, and the third member 30C with heat generated when the light source is driven is reduced, so that deformation of the first member 10, the second member 20, and the third member 30C can be reduced. Accordingly, in the case in which the first member 10, the second member 20, and the third member 30C are used as reflectors for the surface light source, changes in the direction of reflection of light can be reduced, so that luminance unevenness can be reduced.

In the demarcating member 1C, the area in which the second member 20 is bonded to the substrate is greater than in the demarcating member 1A (see FIG. 5 to FIG. 7), so that contraction of the first member 10, the second member 20, and the third member 30C with heat is suppressed compared with the case of the demarcating member 1A, and luminance unevenness is reduced.

In the case in which the demarcating member 1C is used as the reflector for the surface light source, the height from the upper surface of the substrate to the upper ends of the first inclined portions 1s, the height from the upper surface of the substrate to the upper ends of the third inclined portions 3s, the height from the upper surface of the substrate to the upper ends of the fourth inclined portions 4s, the height from the upper surface of the substrate to the upper ends of the fifth inclined portions 5s not overlapping with the second member 20, and the height from the upper surface of the substrate to the upper ends of the seventh inclined portions 7s are preferably equal to one another. The distance from the upper surface of the substrate to the upper surfaces of the first bottom portions 1b, the distance from the upper surface of the substrate to the upper surfaces of the second bottom portions 2b, the distance from the upper surface of the substrate to the upper surfaces of the third bottom portions 3b, and the distance from the upper surface of the substrate to the upper surfaces of the fifth bottom portions 5b are preferably equal to one another. This structure can reduce luminance unevenness in the case in which the demarcating member 1C is used as a reflector for the surface light source.

Other Variations of Demarcating Member

Figure 14:
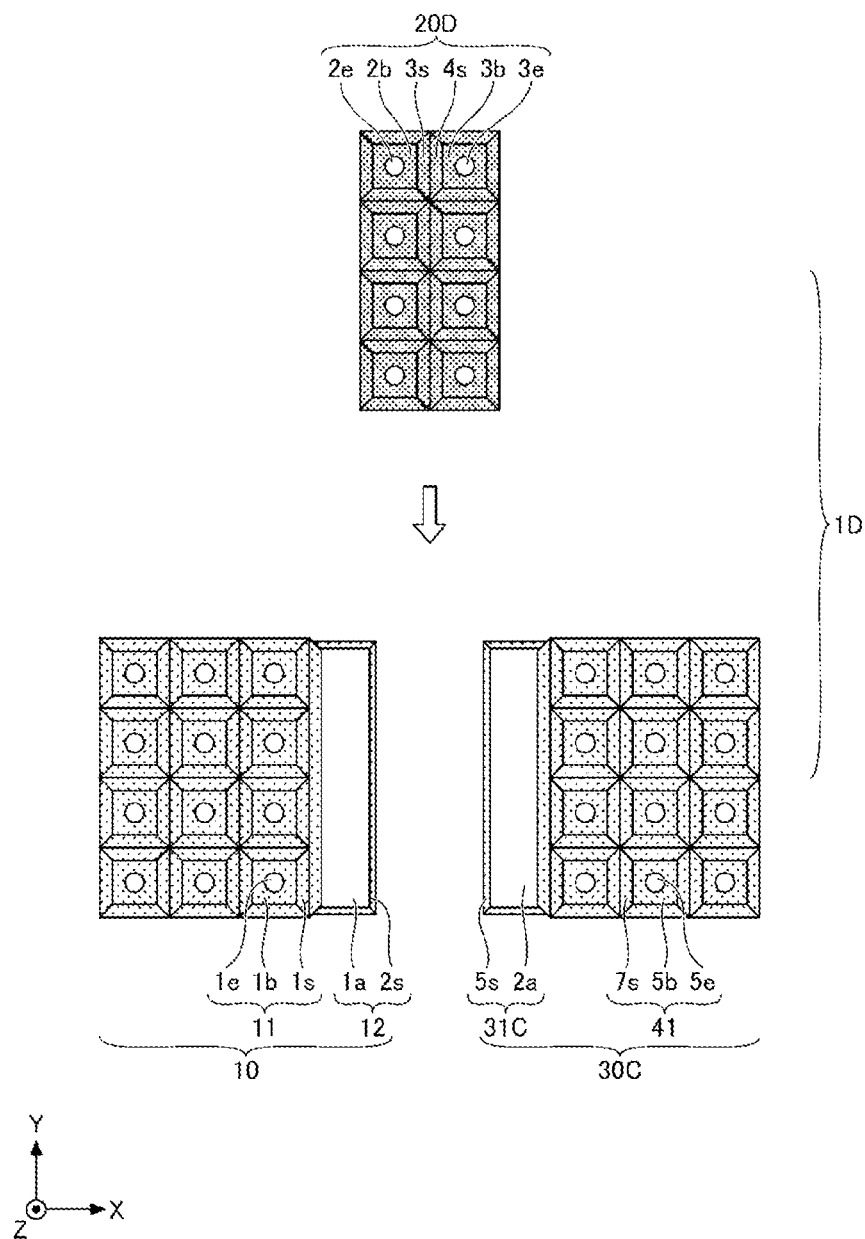
FIG. 14 is an exemplary schematic plan view illustrating an exemplary demarcating member 1D.
Figure 15:
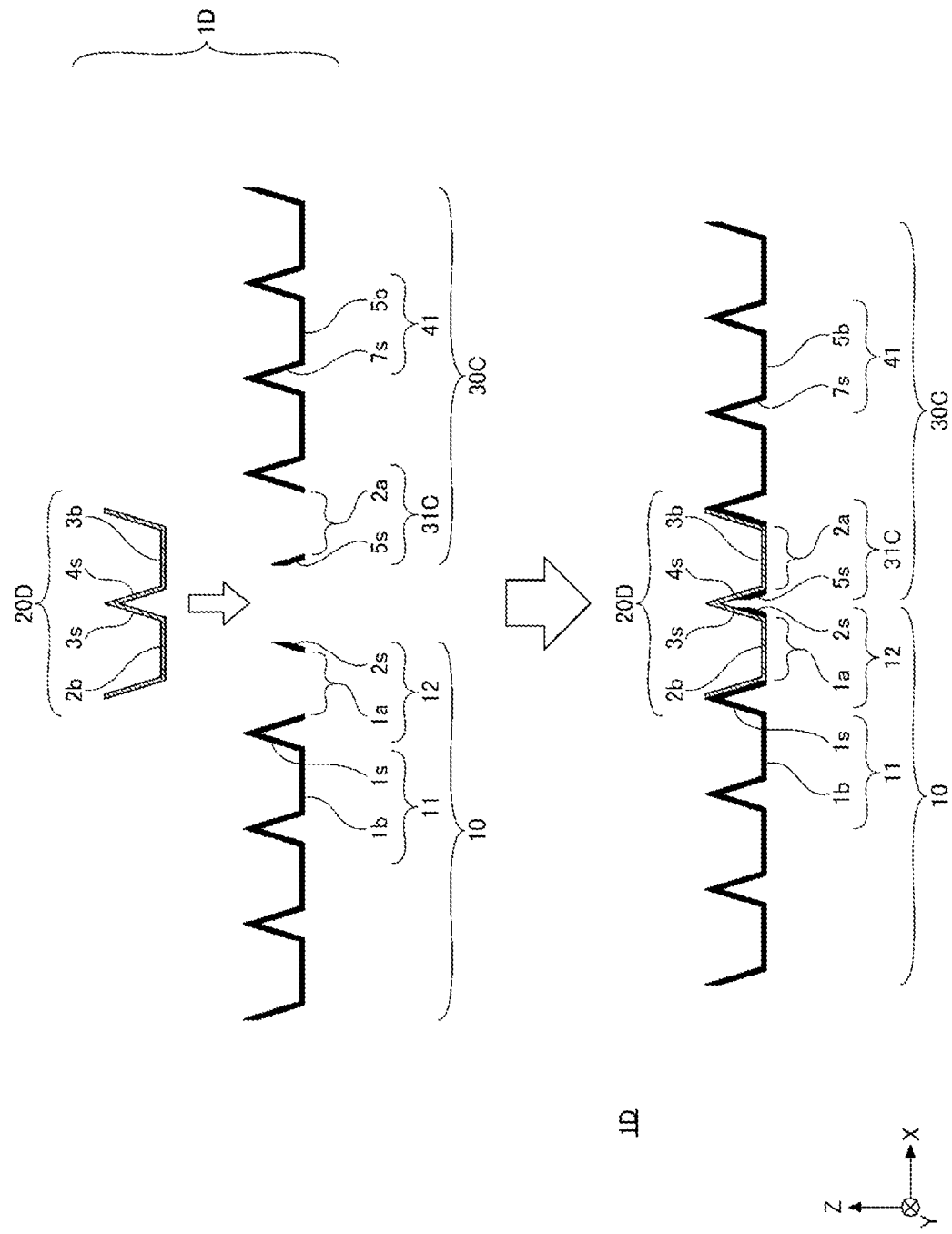
FIG. 15 is an exemplary schematic cross-sectional view illustrating the exemplary demarcating member 1D.

FIG. 14 is a schematic plan view illustrating a demarcating member 1D. FIG. 14 schematically shows a state in which the first member 10 and the third member 30C do not overlap with a second member 20D. FIG. 15 is a schematic cross-sectional view illustrating the demarcating member 1D. FIG. 15 schematically shows the cross section corresponding to FIG. 13 and the like. FIG. 15 schematically shows both states in which the first member 10 and the third member 30C overlap and do not overlap with the second member 20D.

The third inclined portions 3s may surround the second bottom portions 2b as in the second member 20D shown in FIG. 14 and FIG. 15. The distance between opposite third inclined portions 3s decreases toward the lower end side (second bottom portion 2b side) in a cross-sectional view. Each of the third inclined portions 3s located at the outer edges of the second bottom portions 2b on the X− side can overlie the second inclined portion 2s located at the outer edge of the first opening 1a on the X− side. As for the third inclined portions 3s, descriptions of features shared with the demarcating member 1A are not repeated.

The fourth inclined portions 4s may surround the third bottom portions 3b. The distance between opposite fourth inclined portions 4s decreases toward the lower end side (third bottom portion 3b side) in a cross-sectional view. Each of the fourth inclined portions 4s located at the outer edges of the third bottom portions 3b on the X− side can overlie the fifth inclined portion 5s located at the outer edge of the second opening 2a on the X− side. Each of the fourth inclined portions 4s located at the outer edges of the third bottom portions 3b on the X+ side can overlie the fifth inclined portion 5s located at the outer edge of the second opening 2a on the X+ side. As for the fourth inclined portions 4s, descriptions of features shared with the demarcating member 1A are not repeated.

Figure 16:
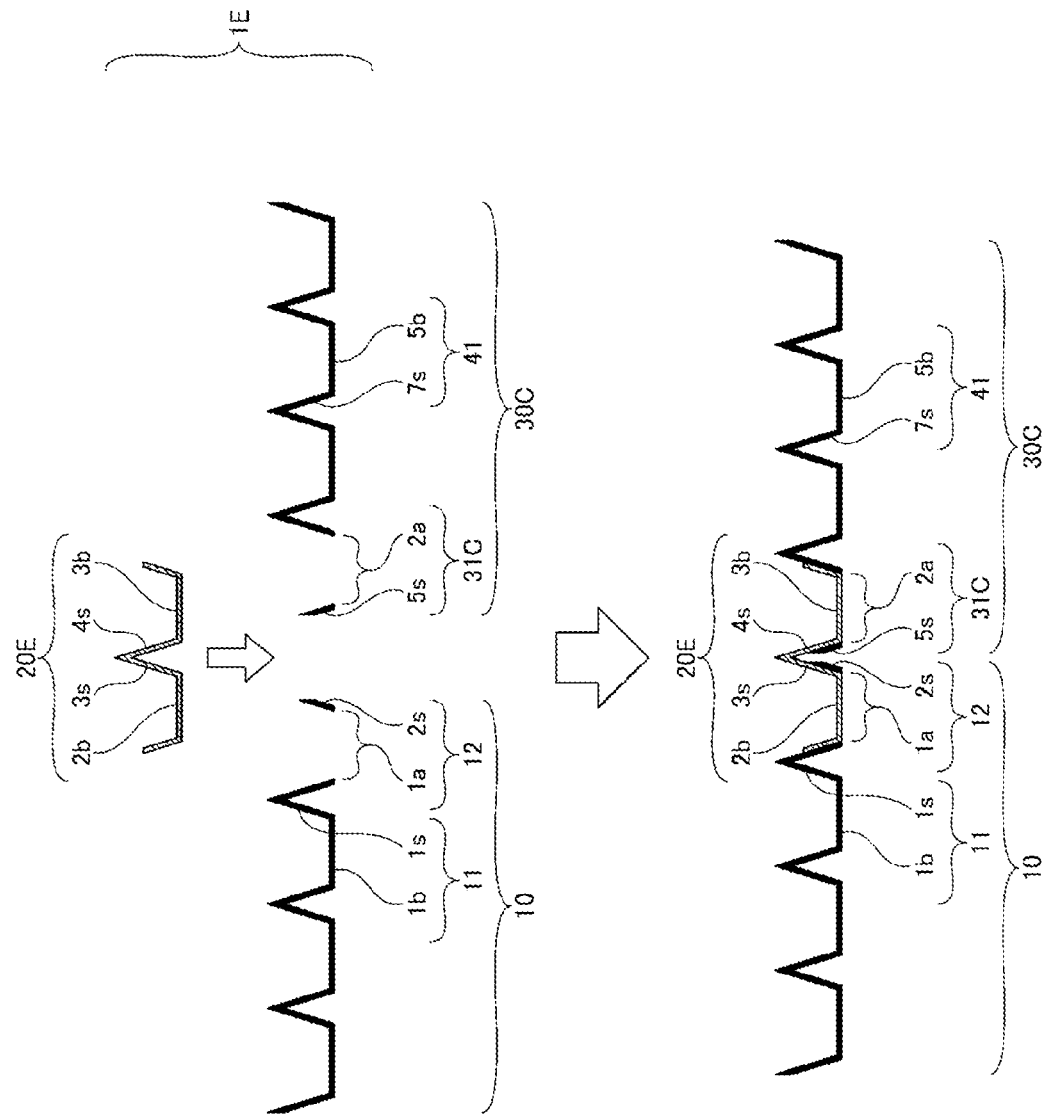
FIG. 16 is an exemplary schematic cross-sectional view illustrating an exemplary demarcating member 1E.

FIG. 16 is a schematic cross-sectional view illustrating a demarcating member 1E. FIG. 16 schematically shows the cross section corresponding to FIG. 13 and the like. FIG. 16 schematically shows both states in which the first member 10 and the third member 30C overlap and do not overlap with a second member 20E.

Like the second member 20E shown in FIG. 16, the third inclined portions 3s on the X− side of the second bottom portions 2b may be shorter than in the case shown in FIG. 14 and FIG. 15 and may overlap with at least the lower end side of the second inclined portions 2s. Likewise, the fourth inclined portions 4s on the X+ side of the third bottom portions 3b may be shorter than in the case shown in FIG. 14 and FIG. 15 and may overlap with at least the lower end side of the fifth inclined portions 5s.

Figure 17:
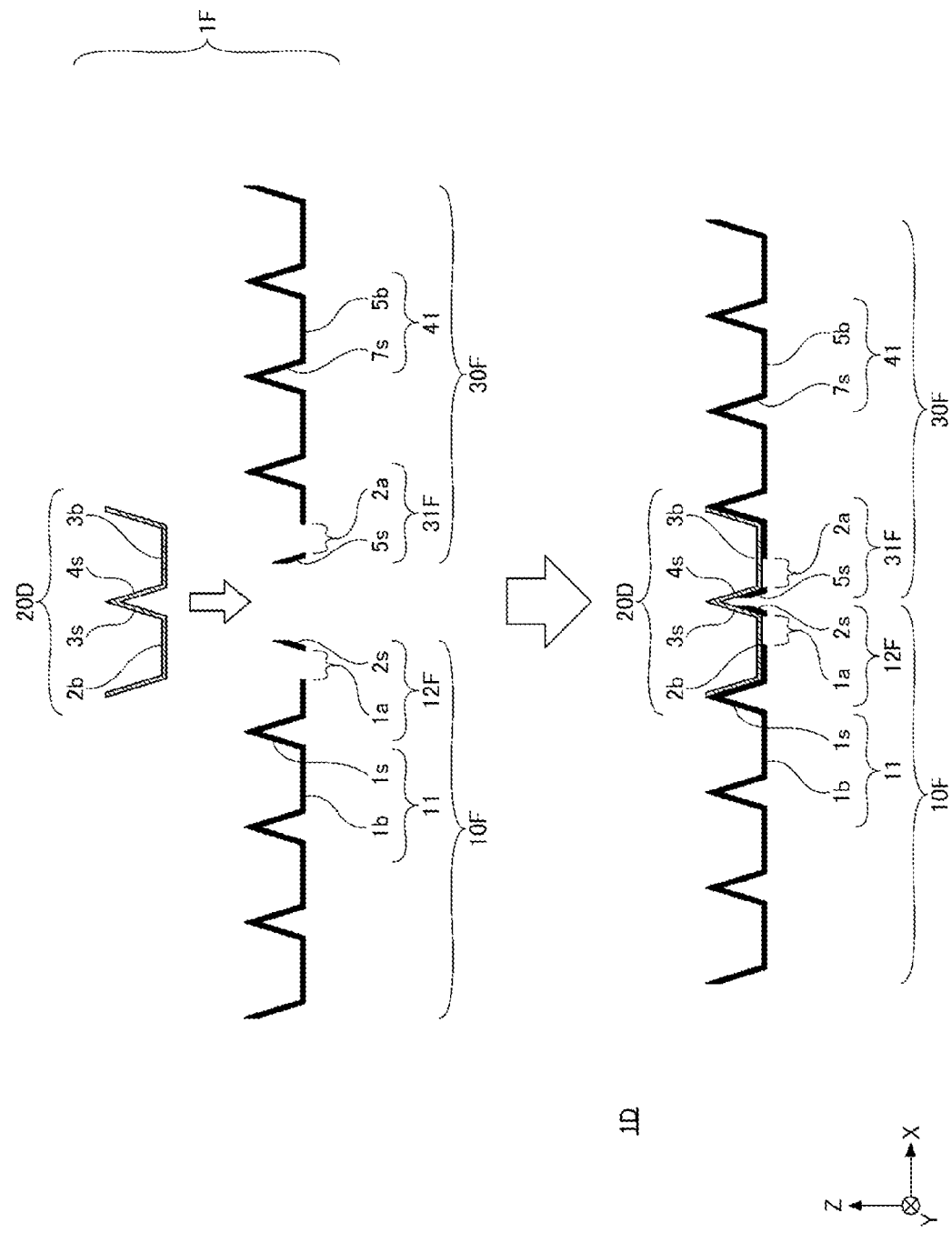
FIG. 17 is an exemplary schematic cross-sectional view illustrating an exemplary demarcating member 1F.

FIG. 17 is a schematic cross-sectional view illustrating a demarcating member 1F. FIG. 17 schematically shows the cross section corresponding to FIG. 13 and the like. FIG. 17 schematically shows both states in which a first member 10F and a third member 30F overlap and do not overlap with the second member 20D.

Like the first member 10F shown in FIG. 17, it is sufficient that the first opening 1a reaches part of the lower ends of the second inclined portions 2s. For example, the first opening 1a can reach the entire lower end of the second inclined portion 2s located at the outer edge of the first opening 1a on the X+ side, part of the lower end of the second inclined portion 2s located at the outer edge of the first opening 1a on the Y+ side, and only part of the lower end of the second inclined portion 2s located at the outer edge of the first opening 1a on the Y− side.

Like the third member 30F shown in FIG. 17, it is sufficient that the second opening 2a reaches part of the lower ends of the fifth inclined portions 5s. For example, the second opening 2a can reach the entire lower end of the fifth inclined portion 5s located at the outer edge of the second opening 2a on the X− side, part of the lower end of the fifth inclined portion 5s located at the outer edge of the second opening 2a on the Y+ side, and only part of the lower end of the fifth inclined portion 5s located at the outer edge of the second opening 2a on the Y− side.

Figure 18:
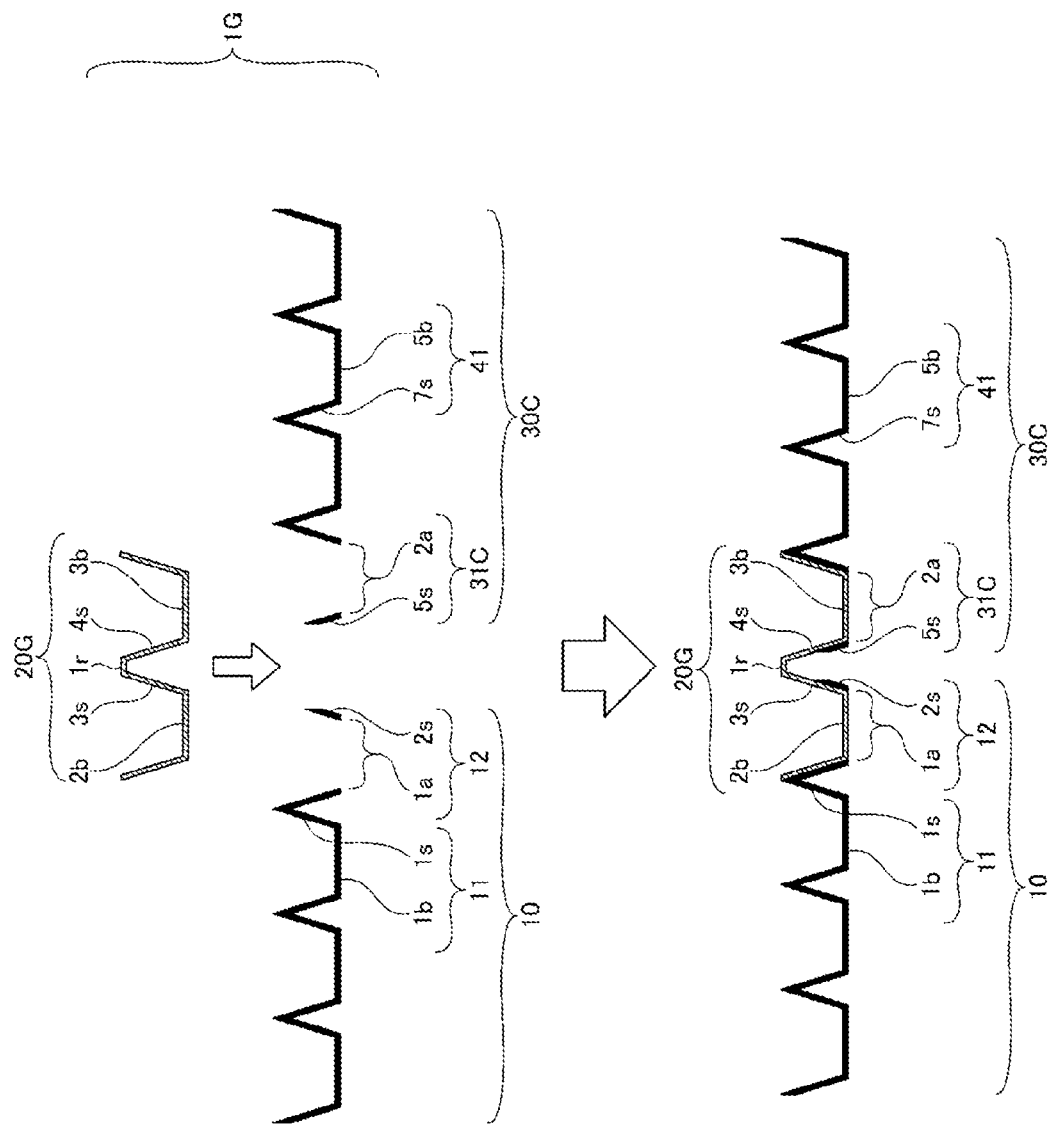
FIG. 18 is an exemplary schematic cross-sectional view illustrating an exemplary demarcating member 1G.

FIG. 18 is a schematic cross-sectional view illustrating a demarcating member 1G. FIG. 18 schematically shows the cross section corresponding to FIG. 13 and the like. FIG. 18 schematically shows both states in which the first member 10 and the third member 30C overlap and do not overlap with a second member 20G.

Like the second member 20G shown in FIG. 18, a connecting portion 1r may be located between the third inclined portion 3s located at the outer edge of the second bottom portion 2b on the X+ side and the fourth inclined portion 4s located at the outer edge of the third bottom portion 3b on the X− side. The connecting portion 1r connects the upper end of the third inclined portion 3s located at the outer edge of the second bottom portion 2b on the X+ side and the upper end of the fourth inclined portion 4s located at the outer edge of the third bottom portion 3b on the X− side. The second member 20G is effective in the case in which a gap is left between the first member 10 and the third member 30C.

Providing the connecting portion 1r in the second member 20G can make the angle between the second bottom portion 2b and the third inclined portion 3s located at the outer edge of the second bottom portion 2b on the X+ side greater than the angle between the second bottom portion 2b and the third inclined portion 3s located at the outer edge of the second bottom portion 2b on the X− side. When the lower end of the third inclined portion 3s located at the outer edge of the second bottom portion 2b on the X+ side is drawn toward the X− side due to thermal contraction, the second member 20G deforms such that the angle between the second bottom portion 2b and the third inclined portion 3s located at the outer edge of the second bottom portion 2b on the X+ side increases. This structure makes the angle between the second bottom portion 2b and the third inclined portion 3s located at the outer edge of the second bottom portion 2b on the X+ side close to the angle between the second bottom portion 2b and the third inclined portion 3s located at the outer edge of the second bottom portion 2b on the X− side, so that the luminance unevenness can be reduced. The same applies to the angle between the third bottom portion 3b and the fourth inclined portion 4s located at the outer edge of the third bottom portion 3b on the X− side.

Figure 19:
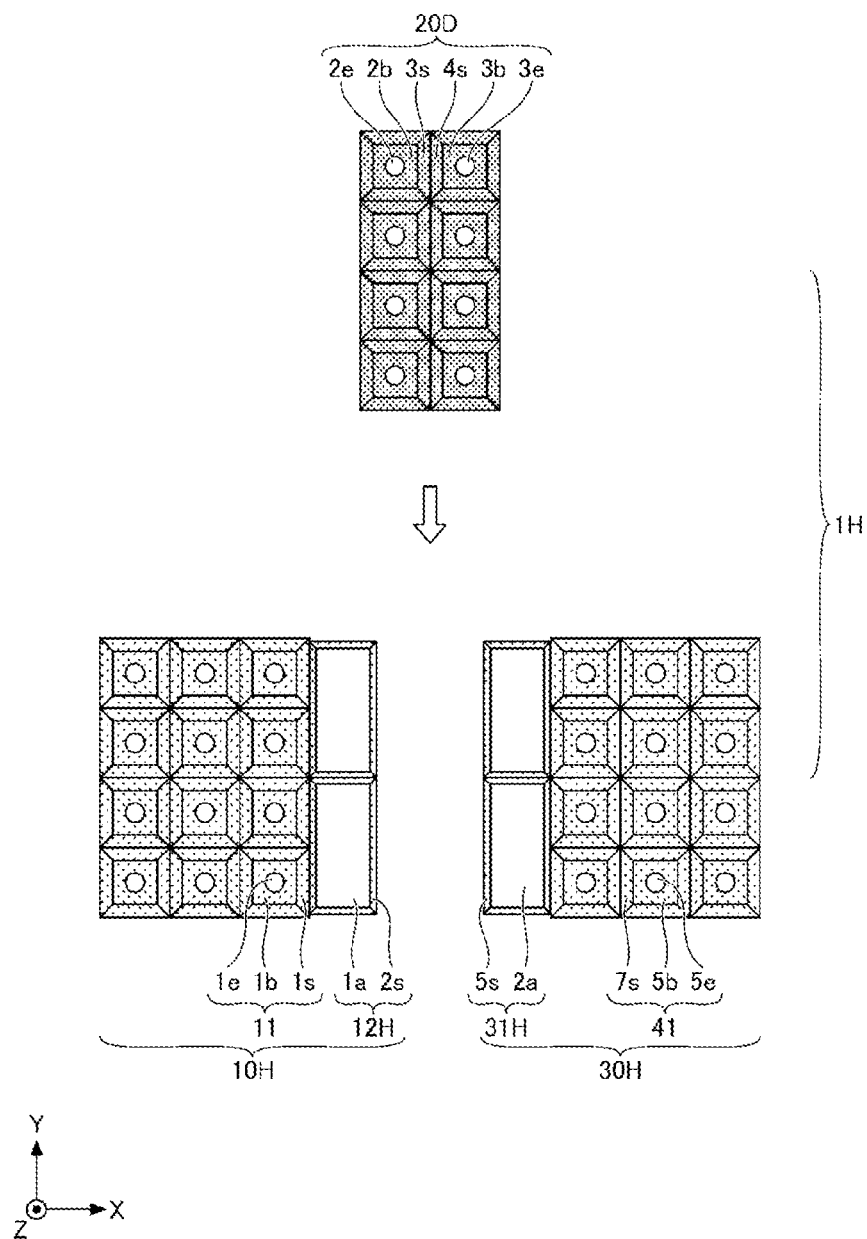
FIG. 19 is an exemplary schematic plan view illustrating an exemplary demarcating member 1H.

FIG. 19 is a schematic plan view illustrating a demarcating member 1H. FIG. 19 schematically shows a state in which a first member 10H and a third member 30H do not overlap with the second member 20D.

Like the one or more second demarcating portions 12H of the first member 10H shown in FIG. 19, the number of the first opening 1a may not be one but may be two or more. In order to provide two or more first openings 1a, the second inclined portion 2s located at the outer edge of the first opening 1a on the X− side is connected to the second inclined portion 2s located at the outer edge of the first opening 1a on the X+ side by other second inclined portions 2s extending in the X direction. The inclined portions demarcating the first opening 1a into a plurality of parts can be located below the third inclined portions 3s located on the Y+ side and Y− side of the second bottom portions 2b of the second member 20D.

Like third demarcating portions 31H of the third member 30H shown in FIG. 19, the number of the second opening 2a may not be one but may be two or more. In order to provide two or more second openings 2a, the fifth inclined portion 5s located at the outer edge of the second opening 2a on the X− side is connected to the fifth inclined portion 5s located at the outer edge of the second opening 2a on the X+ side by other fifth inclined portions 5s extending in the X direction. The inclined portions demarcating the second opening 2a into a plurality of parts can be located below the fourth inclined portions 4s located on the Y+ side and Y− side of the third bottom portions 3b of the second member 20D.

By demarcating the first opening 1a and/or the second opening 2a as described above, the second member 20D is allowed to reduce contraction of the first member 10H and the third member 30H in the Y direction. Accordingly, deformation of the first member 10H and the third member 30H can be suppressed.

In FIG. 19, in a portion of the first member 10H that the second member 20D overlies, the lengths in the X direction and the Y direction of the second demarcating portion 12H, the width from the lower end to the upper end of the second inclined portion 2s in a plan view, and the like may be adjusted. In FIG. 19, in a portion of the third member 30H that the second member 20D overlies, the lengths in the X direction and the Y direction of the third demarcating portion 31H, the width from the lower end to the upper end of the fifth inclined portion 5s in a plan view, and the like may be adjusted.

In the example shown in FIG. 19, the width from the lower end to the upper end of each second inclined portion 2s is less than the width from the lower end to the upper end of each first inclined portion is in a plan view. The height from the lower end to the upper end of each second inclined portion 2s is less than the height from the lower end to the upper end of each first inclined portion 1s. In the example shown in FIG. 19, the width from the lower end to the upper end of each fifth inclined portion 5s is less than the width from the lower end to the upper end of each seventh inclined portion 7s in a plan view. The height from the lower end to the upper end of each fifth inclined portion 5s is less than the height from the lower end to the upper end of each seventh inclined portion 7s.

Figure 20:
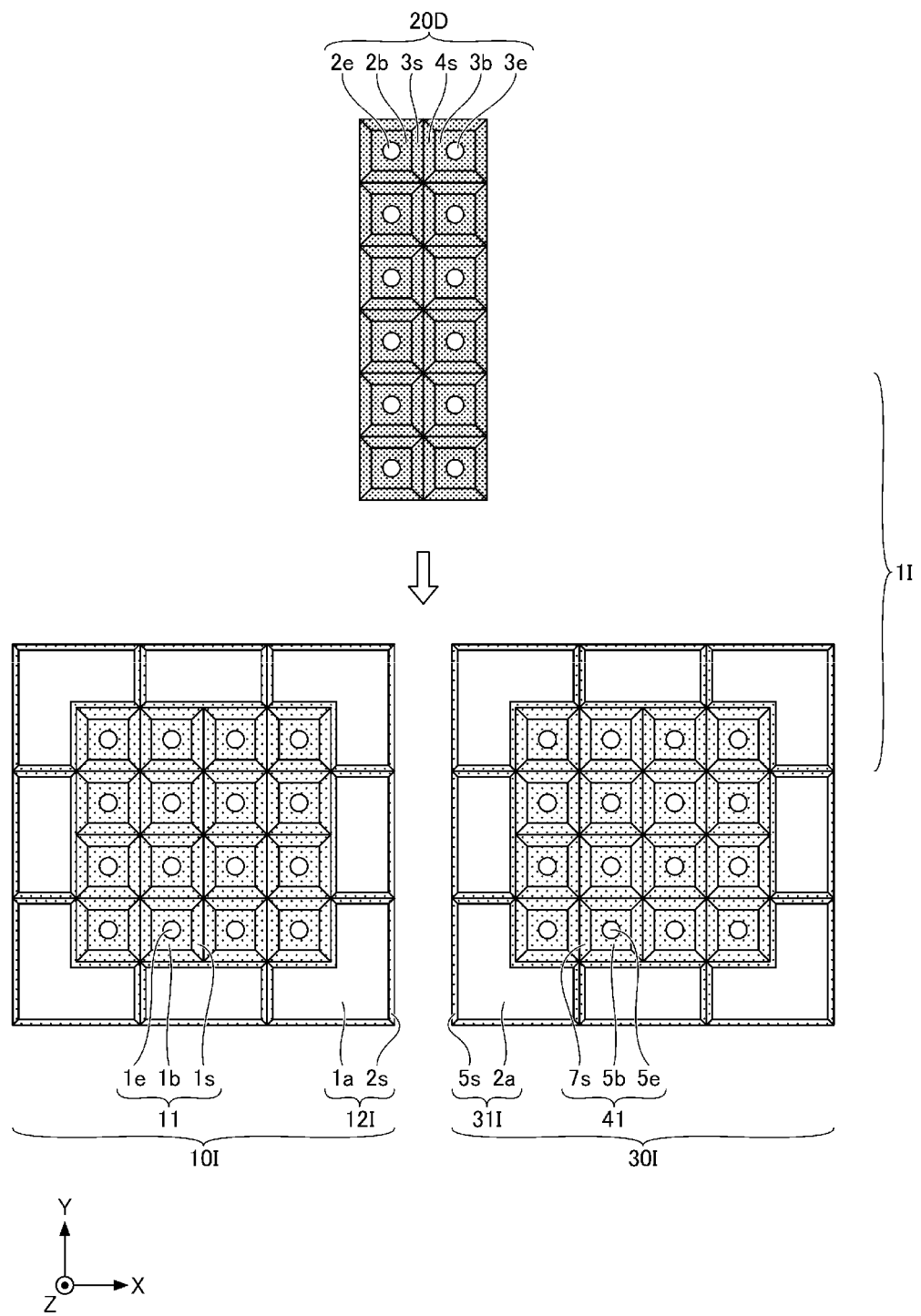
FIG. 20 is an exemplary schematic plan view illustrating an exemplary demarcating member 1I.

FIG. 20 is a schematic plan view illustrating a demarcating member 1I. FIG. 20 schematically shows a state in which a first member 10I and a third member 30I do not overlap with the second member 20D.

In the first member 10I shown in FIG. 20, one or more second demarcating portions 12I including the second inclined portions 2s and the first openings 1a are located around the first demarcating portions 11. The first openings 1a include I-shaped openings surrounded by the second inclined portions 2s and L-shaped openings surrounded by the second inclined portions 2s. For example, the I-shaped openings and the L-shaped openings are alternately arranged along the outer perimeter of the first member 10I.

In the third member 30I shown in FIG. 20, third demarcating portions 31I including the fifth inclined portions 5s and the second openings 2a are located around the fourth demarcating portions 41. The second openings 2a include I-shaped openings surrounded by the fifth inclined portions 5s and L-shaped openings surrounded by the fifth inclined portions 5s. For example, the I-shaped openings and the L-shaped openings are alternately arranged along the outer perimeter of the third member 30I. The third member 30I has the same structure as the first member 10I.

In the example shown in FIG. 20, the second member 20D can overlie the one or more second demarcating portions 12I located on the outer perimeter of the first member 10I on the X+ side and the third demarcating portions 31I located on the outer perimeter of the third member 30I on the X− side. In addition to this structure, a member including an array of a plurality of demarcating portions including the second bottom portions 2b and the third inclined portions 3s surrounding the second bottom portions 2b can overlie the one or more second demarcating portions 12I located on the outer perimeter of the first member 10I on the Y+ side, the Y− side, and the X− side. Likewise, a member including an array of a plurality of demarcating portions including the third bottom portions 3b and the fourth inclined portions 4s surrounding the third bottom portions 3b can overlie the third demarcating portions 31I located on the outer perimeter of the third member 30I on the Y+ side, the Y− side, and the X+ side.

Another first member may be disposed adjacent to the Y+ side, the Y− side, and/or the X− side of the first member 10I. In this case, a member including an array of a plurality of demarcating portions including bottom portions and inclined portions surrounding the bottom portions can overlap with the one or more second demarcating portions 12I located on the outer perimeter of the first member 10I and one or more second demarcating portions that are located on the outer perimeter of the other first member adjacent to the first member 10I and face the one or more second demarcating portions 12I of the first member 10I. The same applies to the third member 30I.

In the case in which the other first member is not disposed on the Y+ side, the Y− side, and/or the X− side of the first member 10I, it is possible that the one or more second demarcating portions 12I are not provided on the outer perimeter of the first member 10I on the side on which the other first member is not disposed. In other words, the first demarcating portions 11 can constitute the outer perimeter of the first member 10I on the side on which the other first member is not disposed. The same applies to the third member 30I.

Figure 21:
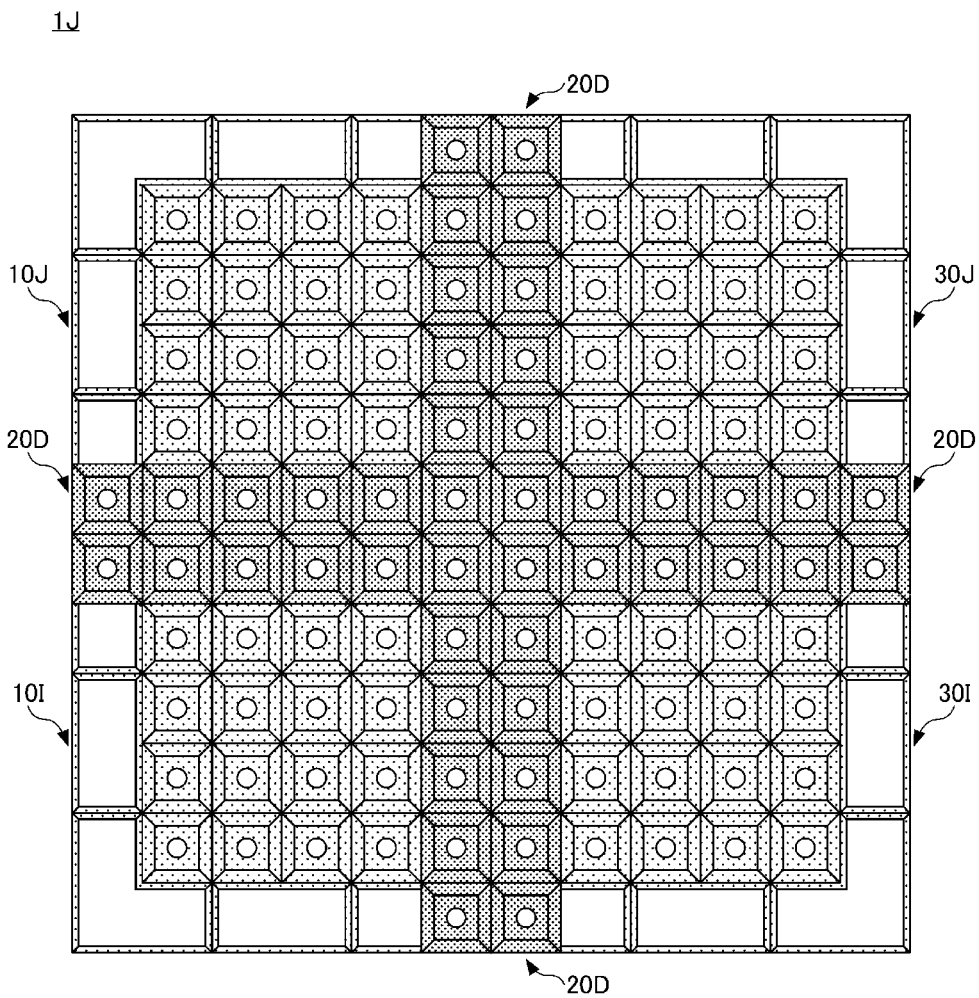
FIG. 21 is an exemplary schematic plan view illustrating an exemplary demarcating member 1J.

FIG. 21 is a schematic plan view illustrating a demarcating member 1J. The demarcating member 1J shown in FIG. 21 includes the first member 10I, the third member 30I, a first member 10J, a third member 30J, and four second members 20D.

In the demarcating member 1J, the third member 30I is disposed on the X+ side of the first member 10I, and the first member 10J is disposed on the Y+ side of the first member 10I. The third member 30J is disposed on the Y+ side of the third member 30I and the X+ side of the first member 10J. The first member 10J has the same structure as the first member 10I, and the third member 30J has the same structure as the third member 30I. That is, all the first member 10I, the first member 10J, the third member 30I, and the third member 30J have the same structure.

A first second member 20D is disposed to overlap with the first member 10I and the third member 30I, and a second member 20D is disposed to overlap with the first member 10I and the first member 10J. A third second member 20D is disposed to overlap with the first member 10J and the third member 30J, and a fourth second member 20D is disposed to overlap with the third member 30I and the third member 30J. The four second members 20D overlap with one another in an overlapping portion at the center of the demarcating member 1J.

Two second members 20D twice as long as the second members 20D shown in FIG. 21 may be disposed to cross each other. In this case, the two second members 20D overlap with each other in an overlapping portion at the center of the demarcating member 1J.

The thickness of the bottom portions, the height of the inclined portions, and the positions of the inclined portions are preferably adjusted such that the overlapping portion in which the second members 20D overlap with each other has the same shape as a non-overlapping portion in which the second members 20D do not overlap with each other. For example, by causing the thicknesses of the second bottom portions 2b and the third bottom portions 3b of each second member 20D in the overlapping portion in which the four second members 20D overlap with one another to be ¼ of those in the non-overlapping portion, the thicknesses of the bottom portions in the overlapping portion and the non-overlapping portion can become closer to each other, and the luminance unevenness can be reduced in the case in which the demarcating member 1J is used as a reflector for the surface light source.

As described above, by using the first member 10I and the third member 30I shown in FIG. 20, a large number of members including demarcating portions can be easily arranged as shown in FIG. 21. This structure allows for a demarcating member in which a larger number of light sources can be disposed.

In FIG. 20, in a portion of the first member 10I that the second member 20D overlies, the lengths in the X direction and the Y direction of the second demarcating portion 12I, the width from the lower end to the upper end of the second inclined portion 2s in a plan view, and the like may be adjusted. In FIG. 20, in a portion of the third member 30I that the second member 20D overlies, the lengths in the X direction and the Y direction of the third demarcating portion 31I, the width from the lower end to the upper end of the fifth inclined portion 5s in a plan view, and the like may be adjusted.

In the example shown in FIG. 20, the width from the lower end to the upper end of each second inclined portion 2s is less than the width from the lower end to the upper end of each first inclined portion 1s in a plan view. The height from the lower end to the upper end of each second inclined portion 2s is less than the height from the lower end to the upper end of each first inclined portion 1s. In the example shown in FIG. 20, the width from the lower end to the upper end of each fifth inclined portion 5s is less than the width from the lower end to the upper end of each seventh inclined portion 7s in a plan view. The height from the lower end to the upper end of each fifth inclined portion 5s is less than the height from the lower end to the upper end of each seventh inclined portion 7s.

As in FIG. 20, in FIG. 21, members each including an array of a plurality of demarcating portions including the second bottom portions 2b and the third inclined portions 3s surrounding the second bottom portions 2b can overlap with the one or more second demarcating portions 12I located on the outer perimeter of the first member 10I on the Y− side and the X− side and the one or more second demarcating portions 12I located on the outer perimeter of the first member 10J on the Y+ side and the X− side. Further, members each including an array of a plurality of demarcating portions including the third bottom portions 3b and the fourth inclined portions 4s surrounding the third bottom portions 3b can overlap with the third demarcating portions 31I located on the outer perimeter of the third member 30I on the Y− side and the X+ side and the third demarcating portions 31I located on the outer perimeter of the third member 30J on the Y+ side and the X+ side.

Demarcating Structure Body 50 and Surface Light Source 60

A demarcating structure body can be constituted by arranging each of the demarcating members described above on the substrate. A surface light source can be constituted by mounting light sources on the demarcating structure body. The demarcating structure body and the surface light source will be described by taking the demarcating member 1D as an example, but another demarcating member such as the demarcating members 1 and 1A described above may be used instead of the demarcating member 1D.

Figure 22:
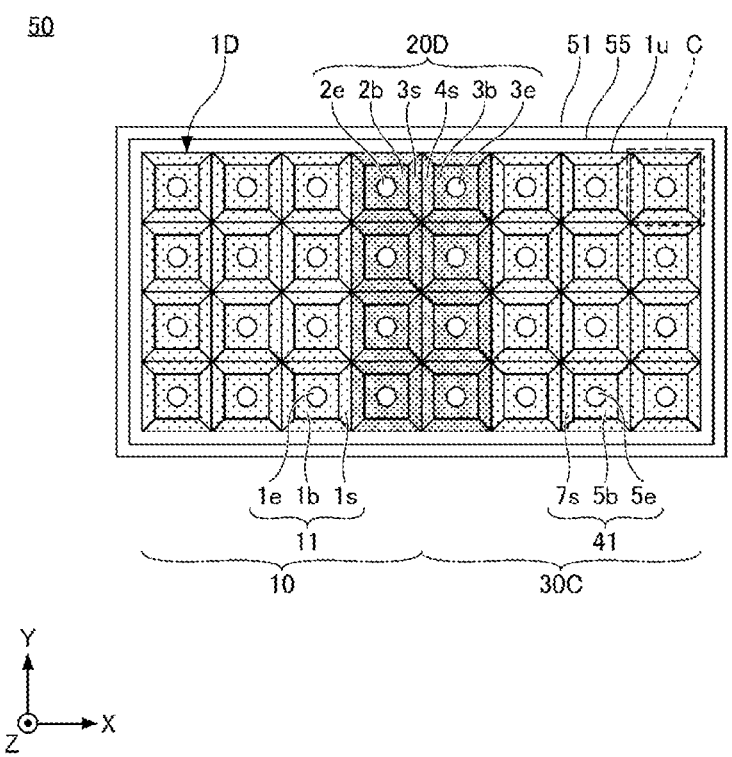
FIG. 22 is an exemplary schematic plan view illustrating an exemplary demarcating structure body according to a first embodiment of the present disclosure.

FIG. 22 is a schematic plan view illustrating a demarcating structure body according to the first embodiment. As shown in FIG. 22, a demarcating structure body 50 includes the substrate 51, a covering member 55, and the demarcating member 1D. The demarcating member 1D is disposed on the substrate 51. The covering member 55 covers at least a portion of the upper surface of the substrate 51. When necessary, the covering member 55 is provided.

In the demarcating member 1D, each region surrounded by inclined portions (first inclined portions 1s, third inclined portions 3s, fourth inclined portions 4s, and seventh inclined portions 7s) is referred to as a section C. The upper end of each inclined portion is denoted by 1u. The boundary between adjacent sections C in a plan view can be regarded as the upper end 1u. The demarcating member 1D is preferably a reflective member.

Figure 23:
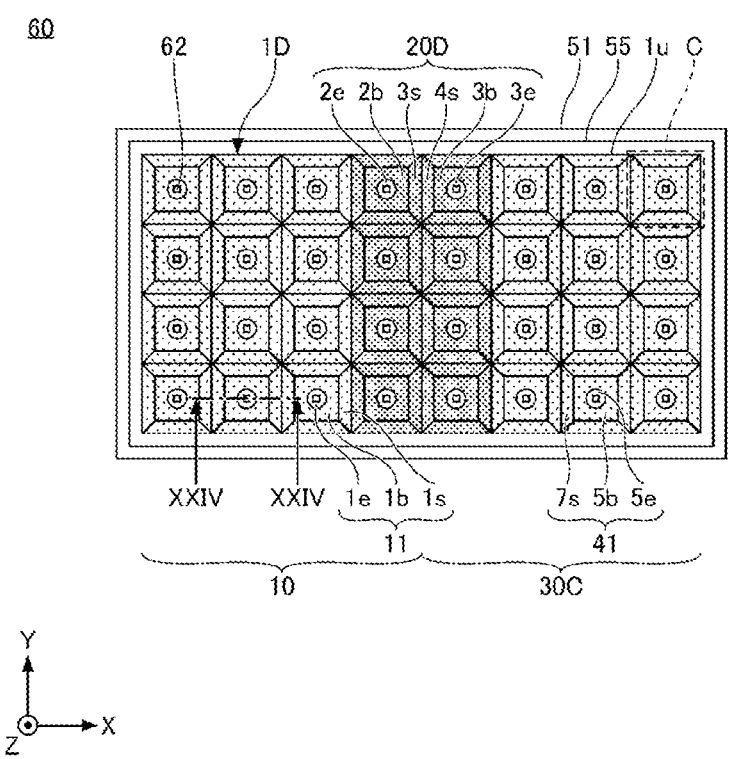
FIG. 23 is an exemplary schematic plan view illustrating an exemplary surface light source according to the first embodiment.
Figure 24:
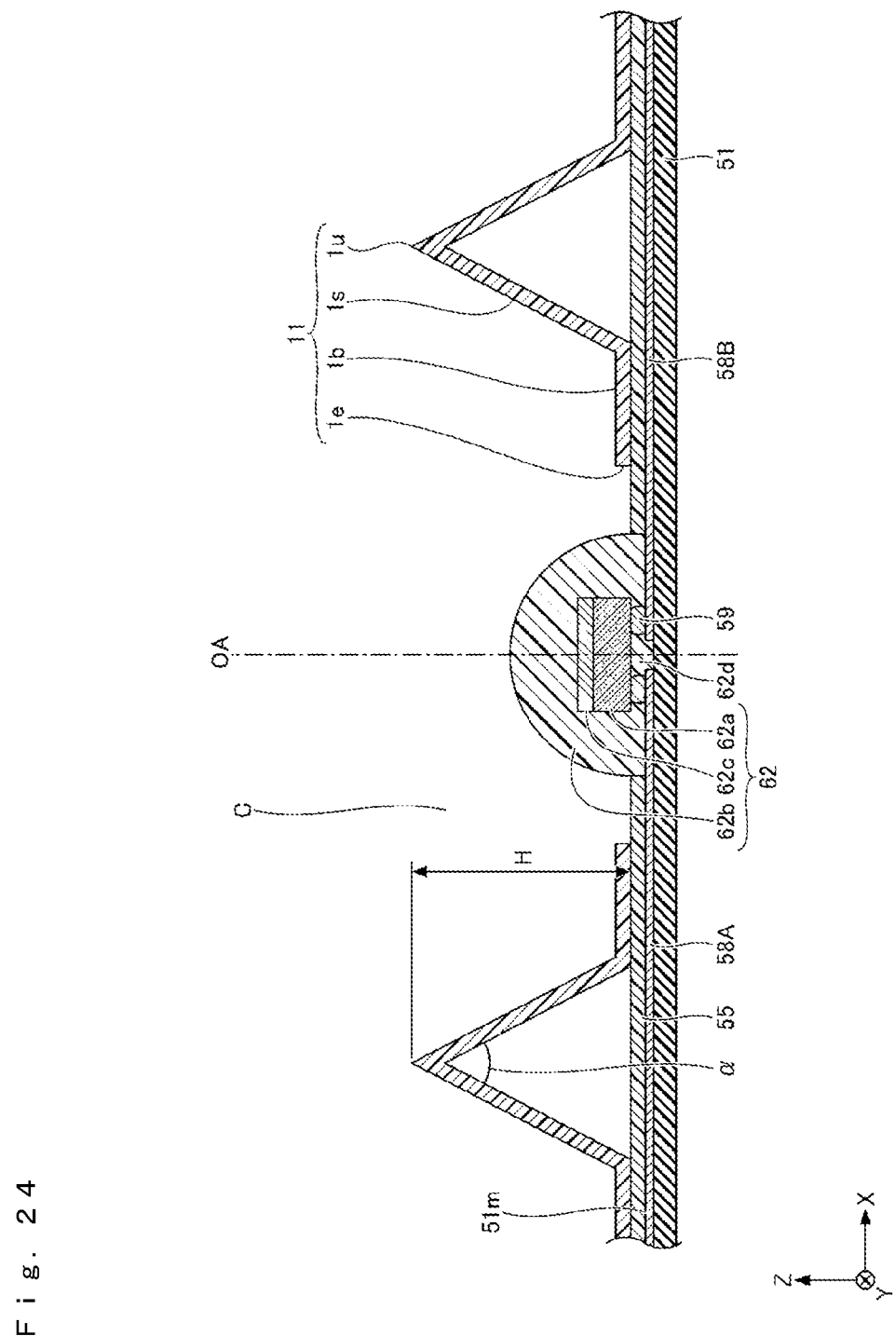
FIG. 24 is a schematic cross-sectional view taken along the line XXIV-XXIV of FIG. 23.

FIG. 23 is a schematic plan view illustrating the surface light source according to the first embodiment. FIG. 24 is a schematic cross-sectional view taken along the line XXIV-XXIV of FIG. 23. As shown in FIG. 23 and FIG. 24, a surface light source 60 is a surface-emitting light-emitting device including the demarcating structure body 50 and a plurality of light sources 62.

In the demarcating structure body 50 and the surface light source 60, the lower surfaces of the first bottom portions 1b and the lower surfaces of the fifth bottom portions 5b of the demarcating member 1D can be bonded to the covering member 55 disposed on the substrate 51. The second bottom portions 2b are located inside the first opening 1a, and the lower surfaces of the second bottom portions 2b are bonded to the covering member 55 disposed on the substrate 51. The third bottom portions 3b are located inside the second opening 2a, and the lower surfaces of the third bottom portions 3b are bonded to the covering member 55 disposed on the substrate 51. That is, the lower surfaces of the first bottom portions 1b and the lower surfaces of the fifth bottom portions 5b of the demarcating member 1D are indirectly bonded to the substrate 51 with the covering member 55 therebetween. The same applies to the second bottom portions 2b and the third bottom portions 3b.

In the surface light source 60, the light sources 62 are respectively disposed on the substrate 51 exposed inside the light source arrangement openings 1e of the first bottom portions 1b, the substrate 51 exposed inside the light source arrangement openings 2e of the second bottom portions 2b, the substrate 51 exposed inside the light source arrangement openings 3e of the third bottom portions 3b, and the substrate 51 exposed inside the light source arrangement openings 5e of the fifth bottom portions 5b. The surface light source 60 will be described below in detail.

Substrate 51

The substrate 51 is a member on which a plurality of light sources 62 are mounted. Conductor wirings 58A and 58B for supplying electricity to the light sources 62 are disposed on the upper surface 51m of the substrate 51. The covering member 55 preferably covers part of the region of the conductor wirings 58A and 58B that is not electrically connected to the light-emitting elements.

The material for the substrate 51 is a material that can insulate at least the pair of conductor wirings 58A and 58B, and examples of the material include ceramics, resins, and composite materials. Examples of the resins include phenolic resins, epoxy resins, polyimide resins, BT resins, polyphthalamide (PPA), and poly(ethylene terephthalate) (PET). Examples of the composite materials include a material in which a resin described above and an inorganic filler such as glass fiber, $SiO_2$, $TiO_2$, and $Al_2O_3$, are mixed, glass fiber reinforced resin (glass epoxy resin), and a metal substrate in which a metal member is covered with an insulating layer.

The thickness of the substrate 51 can be appropriately selected. The substrate 51 may be either a flexible substrate or a rigid substrate that can be manufactured by roll-to-roll processing. The rigid substrate may be a bendable thin rigid substrate. The material for the conductor wirings 58A and 58B is not limited as long as the material is an electroconductive member, and a material generally used for a wiring layer in a circuit board or the like can be used. Light-reflective films or the like may be disposed on the surfaces of the conductor wirings 58A and 58B.

The covering member 55 is preferably constituted of an insulating material. The examples of the material for the substrate 51 also serve as examples of the material for the covering member 55. By using a material in which a white filler or the like is mixed in any of the resins described above for the covering member 55, light emitted from the light sources 62 is reflected, and the light extraction efficiency of the surface light source 60 can be improved.

Light Source 62

The light sources 62 are members that emit light and include, for example, light-emitting elements themselves that emit light by themselves, light-emitting elements sealed in a light-transmissive resin or the like, and surface-mount light-emitting devices (also referred to as LEDs) in which light-emitting elements are packaged. Examples of the light sources 62 include a light-emitting element 62a covered with a sealing member 62b as shown in FIG. 24. Each light source 62 may include a single light-emitting element 62a, or a plurality of light-emitting elements may constitute a single light source 62. The light source 62 may have a structure including a resin surrounding lateral surfaces of the light-emitting element and containing a light-reflective material and a light-transmissive member covering the upper surface of the light-emitting element and the upper surface of the resin containing the light-reflective material. The structure may include a light-transmissive member covering the upper surface of the light-emitting element and a resin surrounding lateral surfaces of the light-emitting element and lateral surfaces of the light-transmissive member and containing a light-reflective material. The light-transmissive member may contain a phosphor. A light-transmissive adhesive member may be disposed between the light-emitting element and the light-transmissive member to bond the light-emitting element to the light-transmissive member.

The light source 62 preferably has a broad light distribution to emit light with little luminance unevenness in each section C surrounded by the inclined portions of the demarcating member 1D. In particular, every light source 62 preferably has a batwing light distribution characteristic. The amount of light emitted directly upward from each light source 62 is thus reduced, the light distribution of each light source 62 is broadened, and the broadened light is applied to each inclined portion and each bottom portion, so that luminance unevenness in each section C surrounded by the inclined portions can be reduced.

The term "batwing light distribution characteristic" as used herein is defined as a characteristic having an emission intensity distribution in which the emission intensity is higher than at 0° at angles larger in absolute value than 0°, which is an optical axis OA, in terms of light distribution angles. The optical axis OA is defined as a line passing through the center of the light source 62 and perpendicularly intersecting the upper surface 51m of the substrate 51 as shown in FIG. 24.

In particular, examples of the light source 62 with the batwing light distribution characteristic include a light source including the light-emitting element 62a provided with a light-reflective film 62c on the upper surface as shown in FIG. 24. By providing the light-reflective film 62c on the upper surface of the light-emitting element 62a, most part of light emitted upward from the light-emitting element 62a is reflected by the light-reflective film 62c, and the amount of light directly above the light-emitting element 62a is reduced, so that the batwing light distribution characteristic is obtained. In order to provide the batwing light distribution, a separate lens may be combined.

The light-reflective film 62c may be any of a film of a metal such as silver and copper, a mixture of a resin and a white filler, and a combination of these members. The light-reflective film 62c may be a dielectric multilayer film (DBR film) and have the incidence angle dependence of the reflectance at the emission wavelength of the light-emitting element 62a. Specifically, the reflectance of the light-reflective film 62c is preferably lower for oblique incidence than for perpendicular incidence. This structure makes changes in luminance directly above the light-emitting element 62a gradual and prevents the area directly above the light-emitting element 62a from becoming dark greatly, such as becoming a dark point.

Examples of the light source 62 include a device in which the height of the light-emitting element 62a directly mounted on the substrate 51 is 100 μm to 500 μm. Examples of the thickness of the light-reflective film 62c include 0.1 μm to 3.0 μm. The thickness of the light source 62 including the sealing member 62b can be about 0.5 mm to 2.0 mm.

A plurality of light sources 62 are preferably wired on the substrate 51 such that the light sources 62 can be driven independently from one another and can each be subjected to light control (such as local dimming and high dynamic range).

Light-Emitting Element 62a

A known element can be used as the light-emitting element 62a. For example, a light-emitting diode is preferably used as the light-emitting element 62a. A light-emitting element with any appropriate wavelength can be selected for the light-emitting element 62a. For example, as a light-emitting element that emits blue or green light, an element including a nitride semiconductor such as GaN, InGaN, AlGaN, and AlInGaN can be used. For a red light-emitting element, GaAlAs, AlInGaP, or the like can be used. Semiconductor light-emitting elements made of other materials may also be used. The composition, emission color, size, and number of the light-emitting elements to be used can be appropriately selected according to the purpose.

Examples of the light-emitting element 62a include an element flip-chip mounted with bonding members 59 therebetween on both of the pair of positive and negative conductor wirings 58A and 58B disposed on the upper surface 51m of the substrate 51 as shown in FIG. 24. The type of mounting of the light-emitting element 62a is not limited to flip-chip mounting but may be face-up mounting.

The bonding members 59 bond the light-emitting element 62a to the substrate or the conductor wirings, and examples of the bonding members 59 include insulating resins and electroconductive members. In the case of flip-chip mounting as shown in FIG. 24, electroconductive members are used. Specific examples include Au-containing alloys, Ag-containing alloys, Pd-containing alloys, In-containing alloys, Pb—Pd-containing alloys, Au—Ga-containing alloys, Au—Sn-containing alloys, Sn-containing alloys, Sn—Cu-containing alloys, Sn—Cu—Ag-containing alloys, Au—Ge-containing alloys, Au—Si-containing alloys, Al-containing alloys, Cu—In-containing alloys, and mixtures of metals and fluxes.

Sealing Member 62b

The sealing member 62b covers the light-emitting element 62a in order to protect the light-emitting element 62a against external environments and optically control light emitted from the light-emitting element 62a (for example, to provide the batwing light distribution characteristic). The sealing member 62b is constituted of a light-transmissive material. For the material of the sealing member 62b, a light-transmissive resin, such as an epoxy resin, a silicone resin, and a mixture of these resins, and glass can be used. Among these materials, a silicone resin is preferably used in consideration of light resistance and ease of molding. The sealing member 62b may contain a diffusing agent that diffuses light emitted from the light-emitting element 62a, a colorant corresponding to the emission color of the light-emitting element 62a, and the like. Diffusing agents and colorants known in the art can be used.

The sealing member 62b can be in direct contact with the substrate 51. The sealing member 62b has a viscosity adjusted to enable printing, application with a dispenser, or the like and can be hardened by heating or light irradiation. Examples of the shape of the sealing member 62b include a substantially hemispherical shape, a convex shape longitudinally oblong in a cross-sectional view, a compressed convex shape in a cross-sectional view, and a circular or elliptic shape in a plan view, but these examples are not limiting. The longitudinally oblong convex shape is a shape in which the maximum length in the direction perpendicular to the upper surface 51m of the substrate 51 is greater than the maximum length in a direction parallel to the upper surface 51m of the substrate 51 in a cross-sectional view. The compressed convex shape is a shape in which the maximum length in a direction parallel to the upper surface 51m of the substrate 51 is greater than the maximum length in the direction perpendicular to the upper surface 51m of the substrate 51 in a cross-sectional view. The sealing member 62b may be disposed between the lower surface of the light-emitting element 62a and the upper surface 51m of the substrate 51 to serve as an underfill 62d.

Demarcating Member 1D

The demarcating member 1D is disposed on the substrate 51. The demarcating member 1D may be directly disposed on the upper surface of the substrate 51 or may be indirectly disposed with the covering member 55 or the like disposed on the upper surface of the substrate 51 therebetween.

In the demarcating member 1D, each of the light source arrangement openings (light source arrangement openings 1e, 2e, 3e, and 5e) is located at the center of the section C. The shape and size of each light source arrangement opening are such that the entire light source 62 is exposed, and the outer edge of each light source arrangement opening is preferably located only near the light source 62. With this structure, light emitted from the light source 62 can also be reflected by each of the bottom portions (first bottom portions 1b, second bottom portions 2b, third bottom portions 3b, and fifth bottom portions 5b) in the case in which the demarcating member 1D is reflective, so that the light extraction efficiency can be enhanced.

The upper end 1u of each inclined portion may be flat or may have the shape of an edge. The vicinity of the upper end 1u of each inclined portion preferably has the shape of an edge. That is, a longitudinal section of each inclined portion constituting the upper end 1u preferably forms a triangle, more preferably an isosceles triangle.

An acute angle of the triangle or the isosceles triangle, that is, the angle (denoted by α in FIG. 24) of each inclined portion on the upper end 1u side, is preferably, for example, 60° to 90°. With such a range, the space and region occupied by the demarcating member 1D can be reduced, the height of the demarcating member 1D can be reduced, and a thickness of the surface light source 60 can be reduced.

The pitch of the upper ends 1u of the inclined portions in the demarcating member 1D can be appropriately adjusted according to the size of the light sources to be used, the intended size of the surface light source, and the like. Examples of the pitch include 1 mm to 50 mm, preferably 5 mm to 20 mm, more preferably 6 mm to 15 mm. Each inclined portion surrounding the light source 62 is preferably constituted of a surface inclined with respect to each bottom portion and the upper surface 51m of the substrate 51 on the section C side.

A height H of the demarcating member 1D itself, that is, the length from the lower surface of each bottom portion to the upper end 1u of the demarcating member 1D, is preferably 8 mm or less. For a surface light source with a reduced thickness, the height is preferably about 1 mm to 4 mm.

The demarcating member 1D is preferably bonded to the substrate 51 using an adhesive member. With the adhesive member bonding the demarcating member to the substrate 51, contraction of the demarcating member 1D can be reduced even when the demarcating member 1D is about to contract with heat. The demarcating member 1D can be bonded using a light-reflective adhesive member applied around each light source arrangement opening such that light emitted from the light source 62 does not enter the gap between the substrate 51 and the demarcating member 1D. For example, a light-reflective adhesive member is more preferably disposed in the form of a ring along the outer edge of each light source arrangement opening. For example, the adhesive member may be a double-sided tape in which an acrylic-resin gluing agent is disposed on both sides of a PET base member, a hot-melt adhesive sheet, or a resin adhesive such as a thermosetting resin and a thermoplastic resin. These adhesive members preferably have high incombustibility. The demarcating member 1D may be screwed on the substrate 51.

As described above, the demarcating member 1D is preferably light-reflective. This allows light emitted from the light source 62 to be effectively reflected upward by each inclined portion and each bottom portion.

The demarcating member 1D may be formed using a resin or the like containing a reflective material made of particles of titanium oxide, aluminum oxide, silicon oxide, or the like, or a reflective material may be disposed on the surface of a member formed using a resin containing no reflective material. Alternatively, a resin containing a plurality of fine air bubbles may be used. In this case, the interfaces between the air bubbles and the resin reflect light. Examples of the resin used for the demarcating member 1D include thermoplastic resins such as acrylic resins, polycarbonate resins, cyclic polyolefin resins, poly(ethylene terephthalate) (PET), and polyesters and thermosetting resins such as epoxy resins and silicone resins. The demarcating member 1D is preferably set such that the reflectance of light emitted from the light source 62 is 70% or more.

The demarcating member 1D may be formed by a forming method using a mold, a forming method by stereolithography, or the like or may be provided by purchasing the demarcating member 1D including each bottom portion and each inclined portion. As the forming method using a mold, a forming method such as injection molding, extrusion molding, compression molding, vacuum molding, and press molding can be applied. For example, vacuum molding is performed using a reflective sheet constituted of PET or the like to provide the demarcating member 1D in which each bottom portion and each inclined portion are integrally formed.

The surface light source 60 may include a diffusion sheet as an optical member disposed above the light sources 62 with the demarcating member 1D therebetween. The diffusion sheet included in the surface light source 60 can improve uniformity of light. The surface light source 60 may further include above the diffusion sheet at least one selected from the group consisting of a wavelength conversion sheet, a first prism sheet, a second prism sheet, and a polarizing sheet. When the surface light source 60 includes one or more of these optical members, uniformity of light can be further improved.

Second Embodiment

In a second embodiment, an example of a liquid-crystal display device (liquid-crystal display) employing the surface light source 60 as a backlight source will be described.

Figure 25:
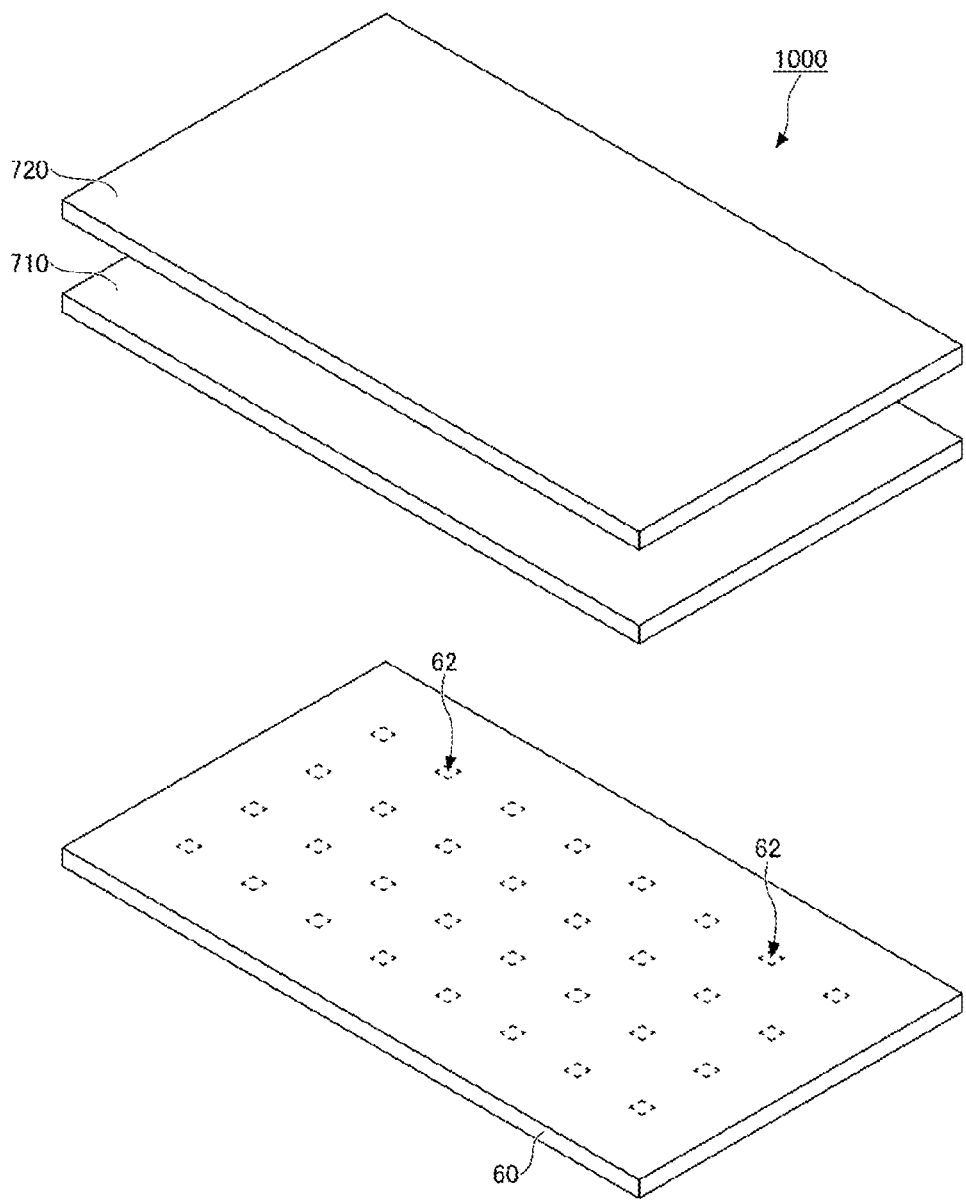
FIG. 25 is an exemplary schematic structural diagram illustrating an exemplary liquid-crystal display device according to a second embodiment of the present disclosure.

FIG. 25 is a schematic structural diagram illustrating the liquid-crystal display device according to the second embodiment. As shown in FIG. 25, a liquid-crystal display device 1000 includes an LCD panel 720, an optical sheet 710, and the surface light source 60 in the order from the top. The surface light source 60 may include a DBEF (reflective polarizing sheet), a BEF (luminance enhancement sheet), or a color filter as an optical member above the light sources 62.

The liquid-crystal display device 1000 is what is called a direct-lit liquid-crystal display device in which the surface light source 60 is layered below the LCD panel 720. In the liquid-crystal display device 1000, light emitted from the surface light source 60 is applied to the LCD panel 720.

In view of reducing a thickness of the surface light source, the thickness of the surface light source can be 15 mm or less. This allows for the surface-emitting light source with a reduced thickness, and the liquid-crystal display device 1000 can be reduced in size.

The surface light source 60 is not limited to the use as a backlight for the liquid-crystal display device 1000. The surface light source 60 can be used as a backlight for a television, a tablet, a smartphone, a smartwatch, a head-up display, digital signage, or a bulletin board. The surface light source can also be employed for a light source for lighting and can be used for an emergency light, a linear lighting, various illuminations, or in-vehicle components.

Certain embodiments and the like have been described above in detail, but the embodiments and the like described above are not limiting. Various modifications and replacement can be performed on the embodiments the like described above within the scope of the claims.

What is claimed is:

1. A surface light source comprising:
a plurality of light sources;
a substrate;
a first member disposed on the substrate and comprising a plurality of recessed first demarcating portions arranged in row and column directions and one or more recessed second demarcating portions adjacent to an outermost column of the first demarcating portions; and
a second member overlying a portion of the first member,
wherein each of the first demarcating portions comprises a first inclined portion and a first bottom portion continuous with a lower end of the first inclined portion,
wherein each of the one or more second demarcating portions comprises a second inclined portion and a first opening reaching at least a portion of a lower end of the second inclined portion in a plan view,
wherein the second member comprises a third inclined portion overlapping with the second inclined portion located at an outer edge on a side of the second member, a fourth inclined portion adjacent to the third inclined portion and not overlapping with the second inclined portion, a second bottom portion located inside the first opening continuously with a lower end of the third inclined portion and bonded to the substrate, and a third bottom portion continuous with a lower end of the fourth inclined portion, and
wherein the plurality of light sources are respectively disposed on the substrate exposed in the first bottom portion, the second bottom portion, and the third bottom portion.

2. The surface light source according to claim 1, further comprising a third member comprising one or more recessed third demarcating portions located in an outermost column on a side of the first member and underlies a portion of the second member,
wherein the one or more third demarcating portions each comprise a fifth inclined portion and a fourth bottom portion continuous with a lower end of the fifth inclined portion,
wherein the fourth inclined portion overlaps with the fifth inclined portion located at an outer edge on the side of the first member, and
wherein the third bottom portion overlaps with the fourth bottom portion.

3. The surface light source according to claim 1, further comprising a third member comprising one or more recessed third demarcating portions located in an outermost column on a side of the first member and underlies a portion of the second member,
wherein the one or more third demarcating portions each comprise a fifth inclined portion and a second opening reaching at least a portion of a lower end of the fifth inclined portion in the plan view,
wherein the fourth inclined portion overlaps with the fifth inclined portion located at an outer edge on the side of the first member, and
wherein the third bottom portion is disposed inside the second opening and bonded to the substrate.

4. The surface light source according to claim 3, wherein the second opening reaches an entire lower end of the fifth inclined portion in the plan view.

5. The surface light source according to claim 2, wherein the fourth inclined portion surrounds the third bottom portion.

6. The surface light source according to claim 2, further comprising a spacing portion between the first member and the third member,
wherein the fourth inclined portion surrounds the third bottom portion,
wherein the second member comprises a sixth inclined portion adjacent to the fourth inclined portion located at an outer edge on a side of the third member,
wherein the sixth inclined portion overlaps with the fifth inclined portion located at an outer edge on the side of the first member, and
wherein the third bottom portion is disposed inside the spacing portion and bonded to the substrate.

7. The surface light source according to claim 2, wherein a height from an upper surface of the substrate to an upper end of the first inclined portion, a height from the upper surface of the substrate to an upper end of the third inclined portion, a height from the upper surface of the substrate to an upper end of the fourth inclined portion, and a height from the upper surface of the substrate to an upper end of the fifth inclined portion are equal to one another.

8. The surface light source according to claim 1, wherein a distance from an upper surface of the substrate to an upper surface of the first bottom portion is equal to a distance from the upper surface of the substrate to an upper surface of the second bottom portion.

9. The surface light source according to claim 1, wherein the first opening reaches an entire lower end of the second inclined portion in the plan view.

10. The surface light source according to claim 1, wherein the third inclined portion surrounds the second bottom portion and overlaps with at least a side of the lower end of the second inclined portion.

11. A liquid-crystal display device comprising the surface light source according to claim 1 as a backlight source.

12. A demarcating structure body comprising:
a substrate;
a first member disposed on the substrate and comprising a plurality of recessed first demarcating portions arranged in row and column directions and one or more recessed second demarcating portions adjacent to an outermost column of the first demarcating portions; and
a second member overlying a portion of the first member,
wherein the first demarcating portions each comprise a first inclined portion and a first bottom portion continuous with a lower end of the first inclined portion,
wherein the one or more second demarcating portions each comprise a second inclined portion and a first opening reaching at least a portion of a lower end of the second inclined portion in a plan view, and
wherein the second member comprises a third inclined portion overlapping with the second inclined portion located at an outer edge on a side of the second member, a fourth inclined portion adjacent to the third inclined portion and not overlapping with the second inclined portion, a second bottom portion located inside the first opening continuously with a lower end of the third inclined portion and bonded to the substrate, and a third bottom portion continuous with a lower end of the fourth inclined portion.

13. A demarcating member comprising:
a first member comprising a plurality of recessed first demarcating portions arranged in row and column directions and one or more recessed second demarcating portions adjacent to an outermost column of the first demarcating portions; and
a second member capable of overlying a portion of the first member,
wherein the first demarcating portions each comprise a first inclined portion and a first bottom portion continuous with a lower end of the first inclined portion,
wherein the one or more second demarcating portions each comprise a second inclined portion and a first opening reaching at least a portion of a lower end of the second inclined portion in a plan view, and
wherein the second member comprises a third inclined portion capable of overlapping with the second inclined portion located at an outer edge on a side of the second member, a fourth inclined portion adjacent to the third inclined portion and not overlapping with the second inclined portion, a second bottom portion located inside the first opening continuously with a lower end of the third inclined portion, and a third bottom portion continuous with a lower end of the fourth inclined portion.

* * * * *